(12) United States Patent
Gong et al.

(10) Patent No.: US 12,322,198 B2
(45) Date of Patent: Jun. 3, 2025

(54) TEXT BASED IMAGE SEARCH

(71) Applicant: Veritone, Inc., Denver, CO (US)

(72) Inventors: Shaogang Gong, Pinner (GB); Qi Dong, London (GB); Xiatian Zhu, Cambridge (GB)

(73) Assignee: VERITONE, INC., Denver, CO (US)

(*) Notice: Subject to any disclaimer, the term of this patent is extended or adjusted under 35 U.S.C. 154(b) by 624 days.

(21) Appl. No.: 17/635,108

(22) PCT Filed: Aug. 5, 2020

(86) PCT No.: PCT/GB2020/051872
§ 371 (c)(1),
(2) Date: Feb. 14, 2022

(87) PCT Pub. No.: WO2021/028656
PCT Pub. Date: Feb. 18, 2021

(65) Prior Publication Data
US 2022/0343626 A1 Oct. 27, 2022

(30) Foreign Application Priority Data
Aug. 15, 2019 (GB) .................................. 1911724

(51) Int. Cl.
*G06V 30/413* (2022.01)
*G06N 3/045* (2023.01)
(Continued)

(52) U.S. Cl.
CPC .......... *G06V 30/413* (2022.01); *G06V 10/454* (2022.01); *G06V 10/76* (2022.01)

(58) Field of Classification Search
None
See application file for complete search history.

(56) References Cited

U.S. PATENT DOCUMENTS

2017/0206465 A1* 7/2017 Jin ...................... G06F 16/5866
2020/0105287 A1* 4/2020 Chang ................. G10L 21/0208
(Continued)

FOREIGN PATENT DOCUMENTS

CN    109002834 A    12/2018
WO    2018/013982 A1   1/2018

OTHER PUBLICATIONS

Fu, Yanwei, et al. "Transductive multi-view zero-shot learning." IEEE transactions on pattern analysis and machine intelligence 37.11 (2015): 2332-2345. (Year: 2015).*
(Continued)

*Primary Examiner* — Sean M Conner
(74) *Attorney, Agent, or Firm* — ONE LLP

(57) ABSTRACT

Method and system for building a machine learning model for finding visual targets from text queries, the method comprising the steps of receiving a set of training data comprising text attribute labelled images, wherein each image has more than one text attribute label. Receiving a first vector space comprising a mapping of words, the mapping defining relationships between words. Generating a visual feature vector space by grouping images of the set of training data having similar attribute labels. Mapping each attribute label within the training data set on to the first vector space to form a second vector space. Fusing the visual feature vector space and the second vector space to form a third vector space. Generating a similarity matching model from the third vector space.

17 Claims, 13 Drawing Sheets

(51) Int. Cl.
*G06V 10/44* (2022.01)
*G06V 10/75* (2022.01)

(56) References Cited

U.S. PATENT DOCUMENTS

2020/0302016 A1* 9/2020 Aggarwal ............ G06V 30/414
2021/0034913 A1* 2/2021 Pan ......................... G06N 3/04

OTHER PUBLICATIONS

Li, Kai, et al. "Linear subspace ranking hashing for cross-modal retrieval." IEEE transactions on pattern analysis and machine intelligence 39.9 (2016): 1825-1838. (Year: 2016).*

Zhu, Yabin, et al. "FANet: Quality-aware feature aggregation network for robust RGB-T tracking." arXiv preprint arXiv:1811.09855 (2018). (Year: 2018).*

Dong, Qi, Shaogang Gong, and Xiatian Zhu. "Person search by text attribute query as zero-shot learning." Proceedings of the IEEE/CVF international conference on computer vision. 2019. (Year: 2019).*

Nov. 5, 2020—(WO) International Search Report and Written Opinion—App PCT/GB2020/051872.

Jan. 20, 2020—(GB) Search Report—APP 1900667.5.

Ma Lin et al: "Bidirectional image-sentence retrieval by local and global deep matching", Neurocomputing, vol. 345, Feb. 4, 2019 (Feb. 4, 2019), pp. 36-44, XP085677053.

Zhedong Zheng et al: "Dual-Path Convolutional Image-Text Embedding", arxiv.org, Cornell University Library, 201 OLIN Library Cornell University Ithaca, NYy 14853, Nov. 15, 2017 (Nov. 15, 2017), XP081288657.

Chen Tianlang et al: "Improving Text-Based Person Search by Spatial Matching and Adaptive Threshold", 2018 Eee Winter Conference on Applications of Computer Vision (WACV), IEEE, Mar. 12, 2018 (Mar. 12, 2018), pp. 1879-1887, XP033337813.

Venugopalan Subhashini et al: "Captioning Images with Diverse Objects", 2017 IEEE Conference on Computer Vision and Pattern Recognition (CVPR), IEEE Computer Society, US, Jul. 21, 2017 (Jul. 21, 2017), pp. 1170-1178, XP033249456.

Textminer, "Training Word2Vec Model on English Wikipedia by Gensim", Mar. 11, 2015, Retrieved from Internet.

* cited by examiner (a) $N_{att}$ branches (b) 4 branches (c) 4 layers

TEXT BASED IMAGE SEARCH

CROSS-REFERENCE TO RELATED APPLICATIONS

This application is a U.S. National Stage application under 35 U.S.C. § 371 of International Application PCT/GB2020/051872, filed Aug. 5, 2020, which claims the benefit of priority to Application GB 1911724.1, filed Aug. 15, 2019. Benefit of the filing date of each of these prior applications is hereby claimed. Each of these prior applications is hereby incorporated by reference in its entirety.

FIELD OF THE INVENTION

The present invention relates to a system and method for optimising a machine learning model and in particular, for generating a machine learning model that can be used to find unlabelled images using text-based only queries.

BACKGROUND OF THE INVENTION

Existing person search imagery methods predominantly assume the availability of at least one-shot image sample of the queried person. This assumption is limited in circumstances where only a brief textual (or verbal) description of the target person is available. A deep learning method for text attribute description based person search is required that does not require any query imagery. Whilst conventional cross-modality matching methods, such as global visual-textual embedding based zero-shot learning (i.e. having no comparison image) and local individual visual attribute recognition exist, they are limited by several assumptions that are not applicable to person search in unstructured surveillance visual data, especially for large scale use, where data quality is low, and/or category name semantics are unreliable. Above all, existing zero-shot learning techniques assume a search query can be provided in the form of an image (not text) and the objective is to find visual matches. Where images are accompanied by metadata then text-based searching is possible without visual content analysis and matching. However, where no such metadata exists (e.g. surveillance and security videos) then this is not possible. Furthermore, a more reliable match against text attribute descriptions (i.e. text-based queries) is required, especially (but not limited) for noisy surveillance person images.

SUMMARY OF THE INVENTION

A variety of publicly available attribute labelled surveillance person search benchmarks exist (e.g. Market-1501, DukeMTMC, and PA100K). These datasets include manually annotated (with attribute labels) images forming attribute labelled training datasets. For example, such datasets include images of people with descriptions for individual images such as, teenage, backpack, short-hair, male, short-sleeves, etc. However, there will be a limit to the breadth of textual attributes for any labelled image dataset.

Separately, there exists much larger datasets of related words. For example, all of the words (e.g. English words) within Wikipedia can be used to train a machine learning model to understand the relationship between different words. The example described in https://textminingonline.com/training-word2vec-model-on-english-wikipedia-by-gensim (retrieved from the internet 8 Aug. 2019) describes the use of the Word2Vec model to achieve this. References [38-42] include descriptions of further word-to-vector text models. The model trained in this way will contain many more different words than those used to label the image datasets. Therefore, a vector space of mapped words is generated. For example, similar words may be found close to each other within text or used in similar contexts.

A further vector space is generated by clustering images that have similar or overlapping attribute labels with images having more of the same attributes being more tightly clustered. All of the attribute labels found within the labelled training data set are used to form a vector space of mapped words.

The label attributes for each image are mapped onto the vector space of mapped words (e.g. from Wikipedia or another large corpus of words). This forms a further vector space. Finally, this further vector space is fused with the vector space of mapped words. The dimensionality of this resultant vector space may be limited or reduced (e.g. to 300-D). This resultant vector space can then be used to form a similarity matching model to bridge purely text-based queries and visual-content based images without requiring meta-data.

To illustrate this, we can use a non-person example. We may have a set of images of birds, where each image is labelled with the bird species (e.g. "swan", "chicken", and "flamingo"). However, there are clearly many more different types of birds than we have images for. We now map each attribute label onto the much larger vector space of mapped words. This mapped vector space can be used to obtain a trained model, which can be applied to unlabelled image data of many different types of birds.

For example, whilst we do not have a labelled image of a duck, the system can still attempt to find an image of such a bird within unlabelled images of birds. This is because the word "chicken" may be clustered relatively close to the word "duck" and certainly further away from the word "flamingo" and in some aspects, chickens can be fairly close to ducks. This provides an opportunity for a model to be trained even though particular image examples are not available. Therefore, using the text query "duck", the system can use the textual clustering (and greater textual knowledge) to find suitable candidate images that may be ducks (e.g. by learning based on images of species similar to ducks). When each image contains more labels then further and more accurate clustering can be achieved. To bring it back into the context of the person search example implementation, the problem becomes finding a textural description of a person (or persons) without any visual examples of the target or targets and having no meta-data tags, neither as a new probe image nor recorded previously. This may be described as Zero-Shot-Search.

In accordance with a first aspect there is provided a method and system for building a machine learning model for finding visual targets from text queries, the method comprising the steps of:
receiving a set of training data comprising text attribute labelled images, wherein each image has more than one text attribute label;
receiving a first vector space comprising a mapping of words, the mapping defining relationships between words;
generating a visual feature vector space by grouping images of the set of training data having similar attribute labels;
mapping each attribute label within the training data set on to the first vector space to form a second vector space;
fusing the visual feature vector space and the second vector space to form a third vector space; and generating a similarity matching model from the third vector space. Therefore, text-based searching of images of any target type (but preferably searching for people) can be carried out more efficiently and reliably without requiring images or video to have associated metadata. Preferably, the queries are pure text queries (i.e. only contain text) and the method operates without visual targets having been tagged by meta-data.

Preferably, the images are images of people and the text attribute labels include physical descriptions of people, including but not limited to: their size, appearance, clothes, age, build, etc.

Preferably, the similarity matching model may be generated using a mean square error loss function.

Preferably, the mean square error loss function may be:

$$\mathcal{L}_{mse} = \frac{1}{N_{batch}} \sum_{i=1}^{N_{batch}} (y_i - \hat{y}_i)^2$$

where $y_i$ and $\hat{y}_i$ denote the ground-truth and predicted similarity of the i-th training pair, respectively and a mini-batch size is specified by $N_{batch}$.

Optionally, the first vector space may be based on a Wikipedia pre-trained word2vector model. Other sources of words may be used. For example, words may be based on books, web pages, dictionaries and/or news publications.

Optionally, the textual terms within the first vector space include the words of the text labels of the images within the training data set.

Optionally, generating the visual feature vector space by grouping images of the set of training data having similar attribute labels may further comprise discriminative learning using a softmax Cross Entropy loss in a Deep Convolutional Neural Network (CNN), where each attribute label is treated as a separate classification task, $\mathcal{L}_{cls}$, according to $$\mathcal{L}_{cls} = -\frac{1}{N_{batch}} \sum_{i=1}^{N_{batch}} \sum_{j=1}^{N_{attr}} \log(p_{ij}),$$

where $p_{ij}$ is a probability estimate of an i-th training sample on a j-th ground truth attribute. Other forms of discriminative learning may be used.

Optionally, mapping each attributed label within the training data set on to the first vector space to form a second vector space may further comprise embedding each attribute label, $z_i^{loc}$, i∈{1, . . . , $N_{att}$}.

Optionally, the method may further comprise the step of obtaining a global textual embedding, $z^{glo}$, according to:

$$z^{glo} = f(\{z_i^{loc}\}_{i=1}^{N_{att}}) = \text{Tanh}\left(\sum_{i=1}^{N_{att}} (w_2^i \cdot \text{Tanh}(w_1^i \cdot z_i^{loc}))\right)$$

where $w_1$ and $w_2$ are learnable parameters and Tan h is a non-linear activation function of a neuron in a Convolutional Neural Network, CNN.

Optionally, the method may further comprise discriminative learning using a softmax Cross Entropy loss in a Deep Convolutional Neural Network (CNN), where each attribute label is treated as a separate classification task, $\mathcal{L}_{cls}$, according to $$\mathcal{L}_{cls} = -\frac{1}{N_{batch}} \sum_{i=1}^{N_{batch}} \sum_{j=1}^{N_{attr}} \log(p_{ij}),$$

where $p_{ij}$ is a probability estimate of an i-th training sample on a j-th ground truth attribute.

Optionally, generating the visual feature vector space by grouping images of the set of training data having similar attribute labels may further comprise building local attribute-specific embedding:

$$(x_i^{loc}, i \in \{1, \ldots, N_{att}\})$$

based on a global part ($x^{glo}$) in a ResNet-50 CNN architecture.

Optionally, fusing the visual feature vector space and the second vector space to form the third vector space may further comprise element-wise multiplication. Other types of vector combining or merging may be used.

Advantageously, the element-wise multiplication may be a Hadamard Product in CNN learning optimisation.

Optionally, for each attribute label a separate lightweight branch with two fully connected, FC, layers in a Convolutional Neural Network (CNN) are used.

Optionally, the method may further comprise cross-modality global-level embedding $s^{glo}$ according to:

$$s^{glo} = x^{glo} \circ z^{glo}$$

wherein ∘ specifies the Hadamard Product.

Optionally, fusing the visual feature vector space and the second vector space to form the third vector space may further comprise forming per-attribute cross-modality embedding according to:

$$s_i^{loc} = x_i^{loc} \circ z_i^{loc}, i \in \{1, \ldots, N_{att}\}.$$

Optionally, fusing the visual feature vector space and the second vector space to form the third vector space may be based on a quality aware fusion algorithm.

Optionally, the method may further comprise estimating a per-attribute quality, $\rho_i^{loc}$, using minimum prediction scores on image and text as:

$$\rho_i^{loc} = \min(p_i^{vis}, p_i^{tex}), i \in \{1, \ldots, N_{att}\}$$

where $p_i^{vis}$ and $p_i^{tex}$ denote ground-truth class posterior probability estimated by a corresponding classifier.

Preferably, the method may further comprise adaptively cross-attribute embedding according to:

$$s^{loc} = f(\{\rho_i^{loc} \cdot s_i^{loc}\}_{i=1}^{N_{att}}).$$

Advantageously, the method may further comprise forming a final cross-modality cross-level embedding according to:

$$s = f(\{s^{loc}, s^{glo}\})$$

where the final embedding s is used to estimate an attribute matching result $\hat{y}$.

In accordance with a second aspect, there is provided the use of the similarity matching model generated according to any of the above methods, to identify unlabelled images from a text query. For example, input keywords may be provided resulting in one or more search results containing an image or images. The search results may be returned as ranked results, for example.

The methods described above may be implemented as a computer program comprising program instructions to operate a computer. The computer program may be stored on a computer-readable medium.

The computer system may include a processor or processors (e.g. local, virtual or cloud-based) such as a Central Processing unit (CPU), and/or a single or a collection of Graphics Processing Units (GPUs). The processor may execute logic in the form of a software program. The computer system may include a memory including volatile and non-volatile storage medium. A computer-readable medium may be included to store the logic or program instructions. The different parts of the system may be connected using a network (e.g. wireless networks and wired networks). The computer system may include one or more interfaces. The computer system may contain a suitable operating system such as UNIX, Windows (RTM) or Linux, for example.

It should be noted that any feature described above may be used with any particular aspect or embodiment of the invention.

BRIEF DESCRIPTION OF THE FIGURES

The present invention may be put into practice in a number of ways and embodiments will now be described by way of example only and with reference to the accompanying drawings, in which:

FIG. 2a shows a schematic diagram of an architecture of a method and system for searching for images;

FIG. 2b shows a further architecture for the system and method of FIG. 2a;

FIG. 2c shows a schematic diagram of the system and method of FIGS. 2a and 2b;

It should be noted that the figures are illustrated for simplicity and are not necessarily drawn to scale. Like features are provided with the same reference numerals.

DETAILED DESCRIPTION OF THE PREFERRED EMBODIMENTS

Figure 1:
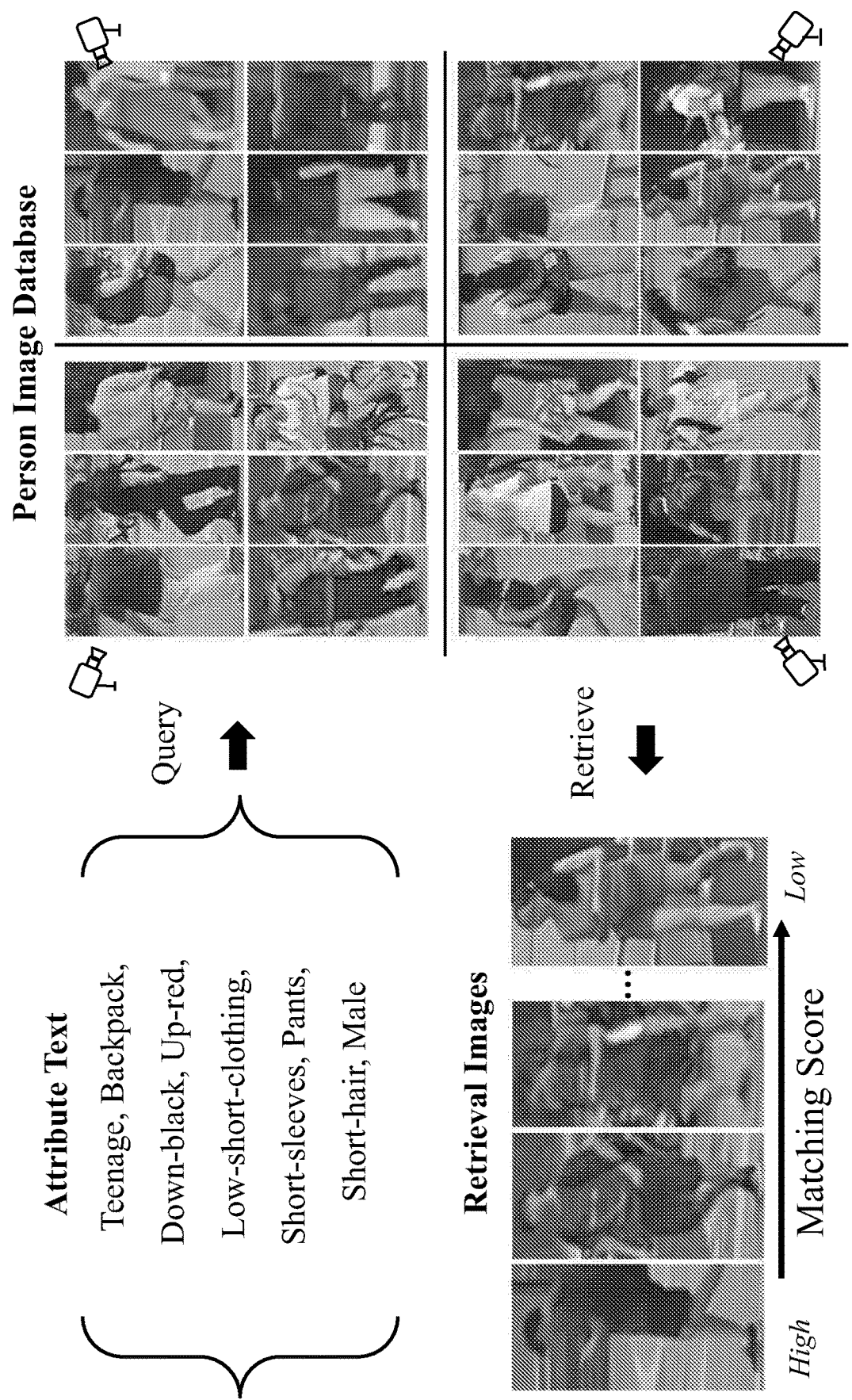
FIG. 1 shows a schematic diagram illustrating how a textual query can be used to search for images.

FIG. 1 shows a high level process for retrieving images (unlabelled) from an image database using a text-based query. Several attribute text descriptions are provided as a query. Images obtained from one or more video streams, for example, can be retrieved based on the query. The retrieved images are provided with a relevancy or matching score according to a confidence level (e.g. relative—Low to High, or quantitative—Percentage).

Figure 2:
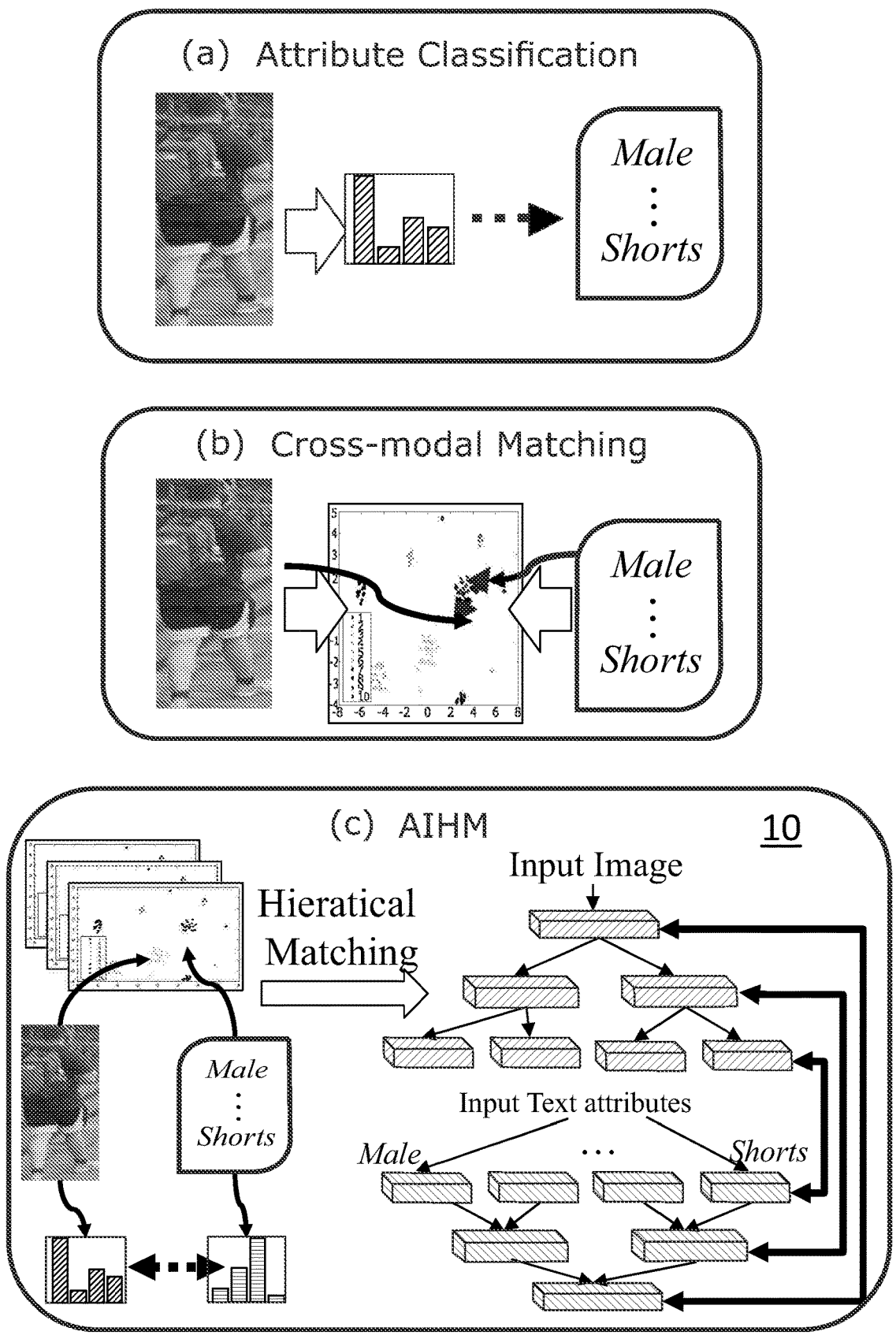

FIGS. 2a-c show schematic diagrams of architectures of a system and method used to implement the text-based retrieval of images described with reference to FIG. 1. In this architecture, a training dataset of images each labelled with several text attributes (e.g. around 10) are provided. This can be described as local attribute-level modelling.

FIG. 2a shows at a high level how individual text attributes of labelled images are classified. FIG. 2b shows at a high level a process for cross-modal matching, i.e. global category-level modelling.

FIG. 2c shows how the system, attribute image hierarchical matching (AIHM) 10, that integrates both the above-mentioned local and global modelling.

Figure 3:
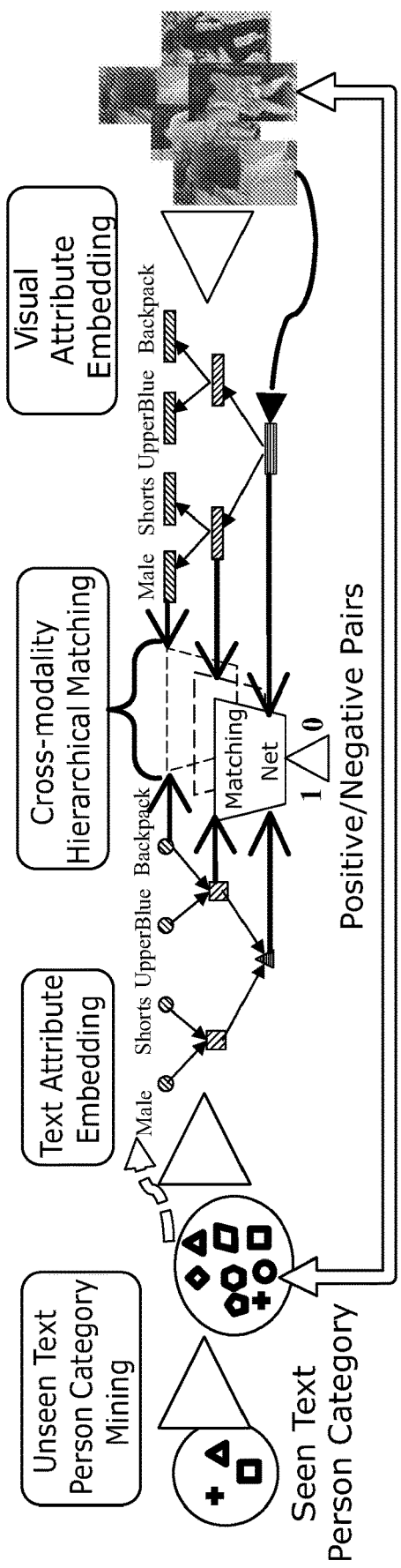
FIG. 3 shows a schematic diagram illustrating a process flow for using a system to provide text-based searching of images.

FIG. 3 shows a schematic diagram of the system 10, which is used to generate an AIHM model. In this example implementation, the system 10 comprises hierarchical visual-textual embedding and cross-modality hierarchical matching. To overcome the Zero-Shot Search challenge (i.e. there is no single query image available for initiating comparison) a simple and effective negative category augmentation strategy is introduced within a matching context that allows for enriching training text data and reducing potential model over-fitting risk.

Figure 4:
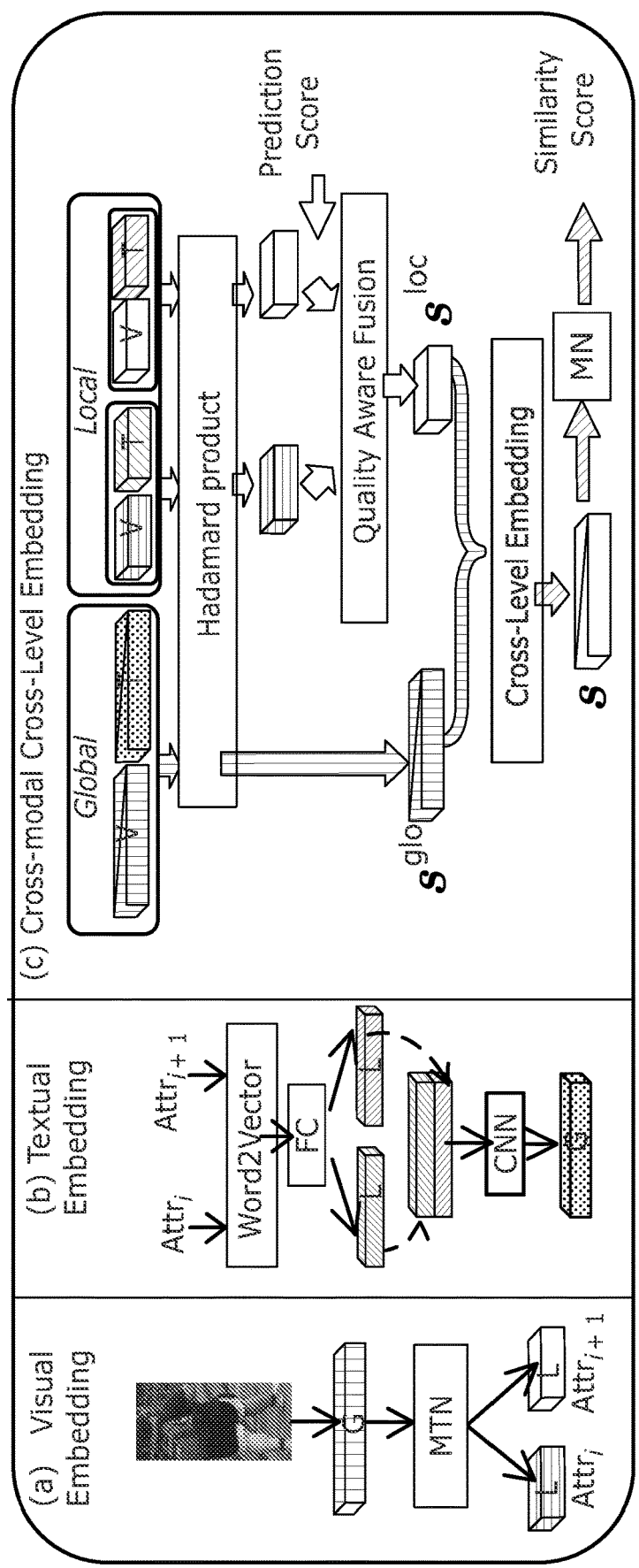
FIG. 4 shows a schematic diagram of components of the system of FIG. 3.

FIG. 4 shows an example implementation of hierarchical visual-textual embedding and matching. The labels of FIG. 4 show MTN: Multi-Task Network; MN: Matching Net. 3 layer fully connected (FCs) are used for similarity score prediction.

Figure 5:
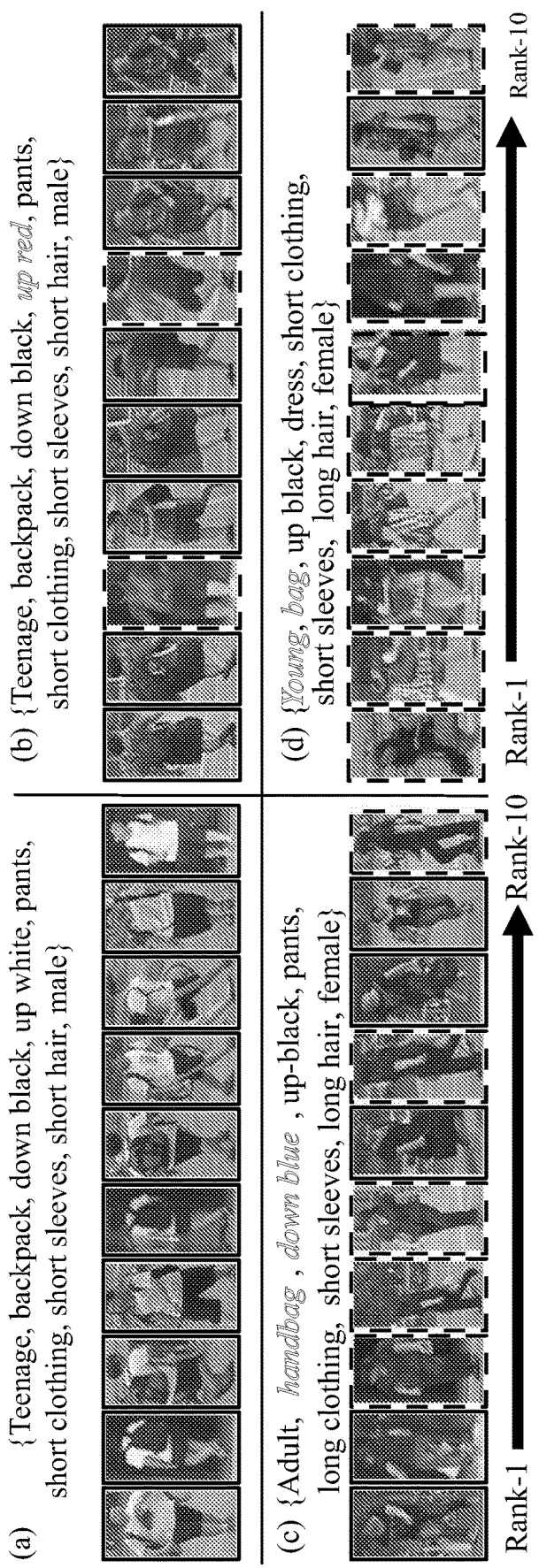
FIGS. 5a to 5d show example results from test queries made using the system of FIG. 3.

FIG. 5 shows example results provided by the system 10. The results of attribute queries are shown based on Market-1501 test data. The text attribute query is shown on top in of each set of results. True/false image matches are indicated by bold and dotted boxes, respectively. The ranking or confidence level is shown under each set of results.

Figure 6:
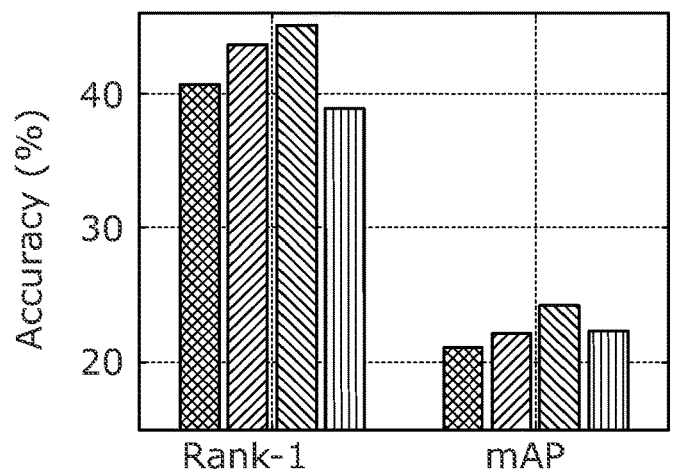
FIG. 6 shows graphical results of experiments using test data on the system of FIG. 3.
Figure 6:
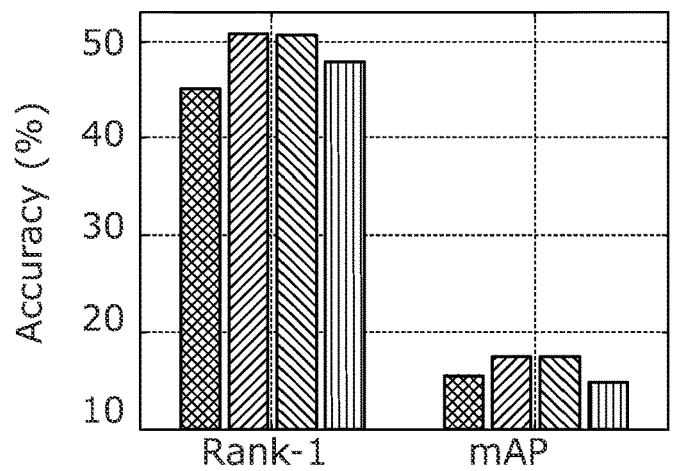
Figure 6:
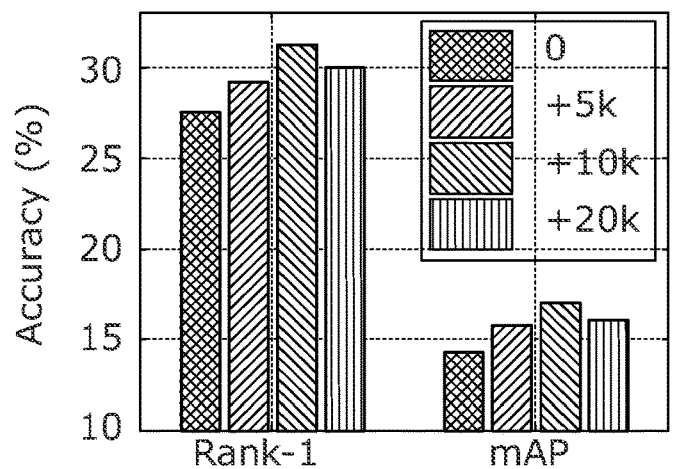

FIG. 6 shows graphically different results based on alternative test data sets. In particular, FIG. 6 shows the accuracy of the top ranked image retrieval result for each set.

Person search in large scale video datasets is a challenging problem with extensive applications in forensic video analysis and live video surveillance [6]. From increasing numbers of smart cities across the world equipped with tens to hundreds of thousands of 24/7 surveillance cameras per city, a massive quantity of raw video data is cumulatively produced daily. It is infeasible for human operators to manually search people (e.g. criminal suspects or missing persons) in such data. Automated person search becomes essential.

Most existing person search methods are based on image queries (probes), also known as person re-identification [6, 8, 16, 35, 36]. Given a query image, a system computes pairwise visual similarity scores between the query image and every gallery image in the test data. The top ranks with the highest similarity scores are considered as possible matches. Such an operation assumes that at least one image (one-shot) of the queried person is available for initiating the search. This is limited when there is only a verbal or text description of the target persons.

There are a number of attempts on person search by text queries, e.g. natural language descriptions [15, 14] or discrete text attributes [33, 10, 27]. To learn such search systems, labelling a large training dataset across textual and visual data modalities is necessary. Elaborative language descriptions not only require more expensive training data labelling, but also present significant computational challenges. This is due to ambiguities in interpretation between language descriptions and image appearance such that: (1) significant and/or subtle visual variations for the same language description; (2) flexible sentence syntax in language descriptions for the same image; and (3) modelling the sequential word dependence in a sentence is a difficult problem, particularly for long descriptions.

In contrast, text attribute descriptions are not only much cheaper in collecting labelled training data, but also more tractable in model optimisation. Importantly, they eliminate the need for modelling complex sentence structures and their correlations to the same visual appearance, and vice versa. Whilst giving a compromise of weaker appearance descriptive capacity, using text attributes favourably enables a more robust and computationally tractable means to execute text-queries for person searches without requiring image probes.

An intuitive approach of text image search is to estimate an attribute vector (text description) of each person image, and then to match the attribute vector of the query person with those of all the gallery person images [10, 27]. By treating the attribute labels independently, this method scales flexibly to handling the huge attribute combination space. However, this technique suffers from lacking a supporting context that accounts for a holistic interpretation of all the text attributes as a whole which helps the text-image matching in person search. The current state-of-the-art model, AAIPR [33], takes the text-image matching strategy but loses the generalisation scalability of individual attribute modelling.

The present system solves the problem of text attribute query person search by providing zero-shot learning (ZSL) [31, 5]. ZSL does not require a probe image to provide results. Potential test query categories (text attribute combinations) image data may exist at large scale, but only a small proportion of these can be available for model training due to the high cost for exhaustively acquiring training data per category. This results in a cross-category problem between model training and test, i.e. zero-shot samples for unseen categories during training. Therefore, the present system and method provide a cross-modal matching method based on global category-level visual-textual embedding with a common zero-shot learning approach. AAIPR [33] also uses the global embedding idea but totally ignores the zero-shot learning challenge in model design.

As a type of solution for attribute query person search, existing ZSL models are however suboptimal. Unlike the conventional ZSL settings that classify a test image into a small number of categories, the present system and method matches a text attribute description against a large number of person images with many more categories. This represents a larger scale and more challenging problem (i.e. a "zero-shot search" problem). Existing state-of-the-art ZSL methods may be based on global category-level visual-textual embedding but scale poorly [31]. One reason for this may be due to insufficient local attribute-level discrimination for more fine-grained matching. Furthermore, surveillance images in person search usually present significantly more noise and ambiguity, presenting a more difficult task. Additionally, lacking semantically meaningful person category names prevents the exploitation of inter-class relationships.

In present system, an Attribute-Image Hierarchical Matching (AIHM) method is formulated. This performs attribute and image matching for person search at multiple hierarchical levels, including both global category-level visual-textual embedding and local attribute-level feature embedding. This method overcomes the limitations of conventional ZSL models and existing text-based person search methods, by benefiting from the generalisation scalability of conventional attribute classification methods. Importantly, cross-modal matching can be end-to-end optimised across different levels simultaneously.

At a high level: (I) An extended ZSL approach is formulated to solve a text attribute query person search problem. The present model solves the intrinsic challenge of limited training category data in surveillance videos. (II) The method (AIHM) is able to match more reliably sparse attribute descriptions with noisy surveillance person images at global category and local attribute levels concurrently. This goes beyond the common ZSL nearest neighbour search. (III) The system and method further introduce a quality-aware fusion scheme for resolving visual ambiguity problems. Extensive experiments show the superiority of the system AIHM over the state-of-the-art methods for attribute query person search on three benchmarks: Market-1501 [35], DukeMTMC [22, 18], and PA100K [19].

Related Work: Person Search. The most common existing person search approach is based on taking bounding box images as probes (queries), framed as an extension of the person re-identification problem [6, 16, 35, 11, 17]. However, image queries are not always available in practice. Recently, text query person search has gained increasing attention with search queries as natural language descriptions [15, 14] or short text keywords (text attributes) [33, 10, 27]. These models enable person search on images by verbal or written text descriptions. Using natural language sentences for person search is attractive due to its natural human user friendliness. However, this imposes extra challenges in computational modelling because (1) accurate and rich training data is expensive to obtain, and (2) modelling consistently and reliably rich and complex sentence syntax and its interpretation to arbitrary images is non-trivial, with added difficulties from poor-quality surveillance images. In contrast, short text attribute descriptions offer a more cost-effective and computationally more tractable approach to solving this problem.

Visual Attributes. Computing visual attributes has been extensively used for person search [12, 10, 11, 23, 21, 29]. The idea is to exploit the visual representation of a person by attributes as the mid-level descriptions, which are semantically meaningful and more reliable than low-level pixel feature representations. For example, Peng et al. [21] mine un-labelled latent visual attributes in a limited attribute label space for enriching the appearance representation. Considered as a more domain-invariant or domain adaptive visual feature representation, Wang et al. [29] exploit visual attribute learning for unsupervised identity knowledge transfer across surveillance domains. All these existing methods are focused on visual attribute representations to facilitate image query person search. On the contrary, the focus of this work is on text query person search.

Text Attributes: A few attempts for text attribute query person search have been proposed [27, 10, 33]. In particular, Vaquero et al. [27] and Layne et al. [10] propose the first studies that treat the problem as a multi-label classification learning task. Whilst flexibly modeling arbitrary attribute combinations, this strategy has no capacity for modelling the holistic person category information and is therefore suboptimal for processing ambiguous surveillance data. More recently, Yin et al. [33] exploit the idea of cross-modal data alignment. This captures the holistic appearance information of persons, but suffers from a cross-category domain gap problem between the training and test data. In contrast, the present system and method considers the problem from a zero-shot learning perspective. Critically, the present system and method not only addresses the limitation of existing solutions but also combines their modelling merits for enabling extra complementary benefits.

Zero-Shot Learning: Attribute query person search can be understood from zero-shot learning (ZSL) [9, 31, 25, 34], due to the need for generalizing to unseen categories. However, there are several significant differences. First of all, most ZSL methods are designed for image classification other than search/retrieval. The latter is often more challenging due to larger search space. In contrast to conventional ZSL setting, there is no meaningful category names in person search. This disables the exploitation of semantic relationships between seen and unseen categories. For example, the imagery data of person search often involve more noise and corruption which is more difficult to handle. These factors render the state-of-the-art ZSL methods less effective for person search, as are demonstrated in the experiments described within the description.

To train a textual attribute query person search model, there is required a labeled set of N image-attribute training pairs, $\mathcal{D} = \{I_i, a_i\}_{i=1}^N$ describing $N_{id}$ different person descriptions. A multi-label attribute text description of a person image may be described as an attribute vector $a_i$ and defines a value of each attribute label with respect to the corresponding person appearance. Persons sharing the same attribute vector description specifying a type of people are considered to belong to a person category. There are a total of $N_{att}$ different binary-class or multi-class attribute labels. This problem may be modeled by zero-shot learning (ZSL) considering that test person categories may be unseen to model training.

A schematic overview of the proposed AIHM model is illustrated in FIG. 3. The objective of AIHM is to learn a similarity matching model between text attributes α and person images I in a hierarchical visual-textual embedding space. Instead of nearest neighbour search as most ZSL methods adopt, the present system and method learns a similarity matching model: $\hat{y}=f_\theta(a, I) \in [0,1]$, with θ being the model parameters. If a specific text-image pair is a true match, then the model should ideally output 1; otherwise 0. For model training, the system and method adopts a mean square error loss function [25]

$$\mathcal{L}_{mse} = \frac{1}{N_{batch}} \sum_{i=1}^{N_{batch}} (y_i - \hat{y}_i)^2 \quad \text{(equation 1)}$$

where $y_i$ and $\hat{y}_i$ denote the ground-truth and predicted similarity of the i-th training pair, respectively. The mini-batch size is specified by $N_{batch}$. To enable such matching, a hierarchical visual-textual embedding is formed (see below) and cross-modality fusion (see below) as the matching input (equation (7)). As a simplification, in the following a two-level hierarchy is assumed: a global category level, and a local per-attribute level. It is straightforward to extend to more hierarchical levels without changing the model designs as described below.

Hierarchical Visual Embedding. For hierarchical visual embedding of a person image, a multi-task joint learning strategy [2] is employed. An overview of hierarchical visual embedding is given in FIG. 4(a). Specifically, a local attribute-specific embedding ($x_i^{loc}$, i∈{1, ..., $N_{att}$}) is built based on the global counterpart $x^{glo}$ in a ResNet-50 architecture [7]. For each attribute label, a separate lightweight branch is used with two fully connected (FC) layers. The design is suitable since only a small number of (~10) attributes usually exist in typical person search scenarios. For examples with many attribute labels, each branch can be assigned with a group of attributes for limiting the branch number as well as the overall model complexity (see table 7 for evaluation).

For discriminative learning of local attribute-level visual embedding, the softmax Cross Entropy (CE) loss is utilised. Each individual attribute label is treated as a separate classification task ($\mathcal{L}_{cls}$). Formally, they are formulated as:

$$\mathcal{L}_{cls} = -\frac{1}{N_{batch}} \sum_{i=1}^{N_{batch}} \sum_{j=1}^{N_{attr}} \log(p_{ij}), \quad \text{(equation 2)}$$

where $p_{ij}$ is the probability estimation of the i-th training sample on a j-th ground truth attribute. By multi-task learning, the global category-level visual embedding can be obtained as the shared feature representation of all local embeddings.

Hierarchical Textual Embedding. A hierarchical embedding of text attributes needs to be learnt. An overview of hierarchical textual embedding is shown in FIG. 4(b). Due to a small amount of training attribute label data (only one attribute vector per person category), it may be challenging to derive a rich textual embedding. In contrast to ZSL, there is no access to meaningful person category names in person search. This prevents the use of a Wikipedia pre-trained word2vector model to represent person category for benefiting from auxiliary knowledge [20]. For text attributes (also available in person search), the most common representation in ZSL is multi-label binary vector, which however is less effective and informative (see table 6).

To enable the benefit of rich Wikipedia information (other text sources can be used), the attribute labels are represented by word to vector (e.g. word2vector) representations. Specifically, word2vector is used model and map each attribute name into a semantic (300-D) space, then further into the local textual embedding space $z^{loc}$ by one FC layer. Similarly, the multi-task learning is adopted for embedding each attribute label ($z_i^{loc}$, i∈{1, ..., $N_{att}$}). To obtain the global textual embedding $z^{glo}$. A simplified approach is average pooling per-attribute embeddings. This may be suboptimal due to lacking of task-specific supervised learning. To overcome this problem, per-attribute embeddings may be combined by a fusion unit consisting of two 1×1 conv layers. This allows for both intra-attribute and inter-attribute fusion:

$$z^{glo} = f(\{z_i^{loc}\}_{i=1}^{N_{att}}) = \text{Tanh}\left(\sum_{i=1}^{N_{att}} \left(w_2^i \cdot \text{Tanh}(w_1^i \cdot z_i^{loc})\right)\right) \quad \text{(equation 3)}$$

where $w_1$ and $w_2$ are learnable parameters and Tan h is a non-linear activation function.

The CE loss function (Eq (2)) is used to supervise the textual embedding. In training, the embedding loss and matching loss may be jointly optimised end-to-end with identical weight. Note, unlike the visual embedding process, the global category-level textual embeddings is obtained by combining all local attribute-level counterparts, an inverse process. This is due to additionally using auxiliary information (e.g. Wikipedia).

Negative Category Augmentation. The one-shot per category problem in textual modality raises model training difficulty. To alleviate this problem, negative category augmentation is exploited for AIHM model learning. This may be achieved by generating new random attribute vectors. This uses synthesised attribute vectors as negative samples in the matching loss (Eq (1)). This helps alleviate the model over-fitting risk whilst enhancing the sparse training data, particularly for global textual embedding. Existing ZSL and person search methods do not use or leverage this strategy. One possible reason is that previous methods mostly do not exploit negative cross-modality pairs in objective learning loss function. The efficacy of this scheme is demonstrated within the graphs of FIG. 6.

Cross-Modality Cross-Level Embedding. Given hierarchical visual-textual embedding as described above, these are combined across modalities and levels to form the final embedding for attribute-image matching. An illustration of this cross-modality cross-level embedding is shown in FIG. 4(c). To this end, one alternative fusion method is concatenating two embedding vectors for each training pair [14, 15, 32]. This however may be suboptimal, due to lacking the feature dimension correspondence across modalities which makes the optimisation ineffective. Instead, a Hadamard Product is deployed that fuses two input vectors by element-wise multiplication.

Cross-Modality Global-Level Embedding. The cross-modality global-level embedding $s^{glo}$ may be defined as:

$$s^{glo} = x^{glo} \circ z^{glo} \qquad \text{(equation 4)}$$

where $\circ$ specifies the Hadamard product.

Cross-Modality Local-Level Embedding. Unlike the single global-level embedding, multiple local per-attribute embeddings are required in both modalities. Therefore, per-attribute cross-modality embedding may be formed as:

$$s_i^{loc} = x_i^{loc} \circ z_i^{loc}, i \in \{1 \ldots, N_{att}\} \qquad \text{(equation 5)}$$

Fusing over attributes then takes place. Instead of average pooling, a quality aware fusion algorithm may be used. This is based on two considerations: (1) Both surveillance imagery (poor quality with noisy and corrupted observations) and attribute labelling (annotation errors due to poor imaging condition) are not highly reliable. Trusting all attributes and treating them equally in matching is prone to error; and (2) The significance for person search may vary across attributes.

Specifically, to estimate the per-attribute quality $p_i^{loc}$, minimal prediction scores may be used on image and text as $p_i^{loc} = \min(p_i^{vis}, p_i^{tex})$, $i \in \{1, \ldots, N_{att}\}$, where $p_i^{vis}$ and $p_i^{tex}$ denote the ground-truth class posterior probability estimated by the corresponding classifier. This discourages the model fit towards corrupted and noisy observations. Based on this quantity measure, a fusion unit (Eq (3)) leans adaptively cross-attribute embedding as:

$$s^{loc} = f(\{p_i^{loc} \cdot s_i^{loc}\}_{i=1}^{N_{att}}) \qquad \text{(equation 6)}$$

Cross-Modality Cross-Level Embedding. A fusion unit (Eq (3)) is used to form the final cross-modality cross-level embedding as:

$$s = f(\{s^{loc}, s^{glo}\}) \qquad \text{(equation 7)}$$

The final embedding s is used to estimate the attribute-image matching result $\hat{y}$ (Eq (1)) given an input attribute query and person image.

EXPERIMENTS

Datasets. In evaluations, two publicly available person search (Market-1501 [35], DukeMTMC [22, 18]) and used as well as one large pedestrian analysis (PA100K [19]) benchmarks. These datasets present good challenges for person search with varying camera viewing conditions. Standard evaluation settings were followed. The dataset statistics are summarised in table 1.

Performance Metrics. The CMC and mAP were used as evaluation metrics. As [33], the gallery images were treated respecting a given attribute vector query as true matches.

Implementation Details. For fair comparison to [33], ResNet-50 [7] was used as the backbone net for learning visual embedding. Adam was employed as the optimiser. The batch size was set to 16 (attribute-image pairs), the learning rate to 1e-5, and the epoch number to 150. In each mini-batch, on-the-fly 16/255(16*16−1) positive/negative text-image training pairs were formed. 50 training person categories for parameter cross-validation were used. A two-layer hierarchy in AIHM for the main experiments, with different hierarchy structures evaluated independently were used.

The system and method (AIHM) were compared with a wide range of plausible solutions to text attribute person search methods in two paradigms: (1) Global category-level visual-textual embedding methods: Learning to align the distributions of text attributes and images in a common space, including CCA [1, 30, 3, 24] or MMD [26] based cross-modal matching models, ZSL methods (DEM [34], RN[25], GAZSL [37]), visual semantics embedding (VSE++[4]), and GAN based cross-modality alignment (AAIPR [33]). (2) Local attribute-level visual-textual embedding methods: Learning attribute-image region correspondence, including region proposal based dense text-image cross-modal matching (SCAN [13]), natural language query based person search (GAN-RNN [15] and CMCE [14]). Officially released codes were used with careful parameter tuning if needed, e.g. those originally applied to different applications. In testing language models [4, 13, 15, 14], random attribute sentences were used due to no ordering and reported the average results of 10 trials. For all methods, ResNet-50 was used for visual embedding.

Results. The person search performance comparisons on three benchmarks are shown in table 2. It is evident that our AIHM model outperforms all the existing methods, e.g. surpassing the second best and state-of-the-art person search model AAIPR [33] by a margin of 5.0%/3.7% in Rank-1/mAP on Market-1501. The performance margins over other global visual-textual embedding methods and local region correspondence learning model are even more significant. In particular, state-of-the-art ZSL models also fail to excel due to the larger scale search, more ambiguous visual observation, and meaningless category names. Overall, these results show that despite their respective modelling strength, either global and/or local embedding alone are suboptimal for the more challenging person search problems. It is clearly beneficial to the overall model performance if their complementary advantages are utilised as formulated in the AIHM model.

Qualitative Analysis and Visual Examination. To provide more in-depth and visual examination on the performance of the system (AIHM) 10, a qualitative analysis was conducted, as shown in FIG. 5. It is clear that the majority of the search results in top-10 by AIHM match the attribute query precisely, with a few false matches due to the very similar visual appearance of different person categories. For example, AIHM succeeds in detecting the tiny "handbag" in the Rank 1 image (c) and the "backpack" with the very limited visible part in the Rank 1 image (a), thanks to the capability of local correspondence matching across modalities.

False retrieval images are often due to ambiguous visual appearances and/or text descriptions. For example, the Rank 7 image (b) is with "up-purple" whilst the Rank 9 is with "up-red". Such a colour difference is visually very subtle even for humans. Another example with visual ambiguity is "blue" vs "black" (c). In terms of ambiguous text attribute descriptions "Teenage" and "Young" are semantically very close. This causes the failure search results (d), where "Teenage" person images in top-7 are instead retrieved against the query attribute "Young".

Further Analysis and Discussion. Hierarchical embedding and matching. The effect and complementary benefit of joint local attribute-level and global category-level visual-textual embedding in AIHM was examined. This is conducted by comparing individual performances with their combinations. Table 3 shows that: (1) Either embedding alone is already considerably strong and discriminative for person search. Local AIHM embedding alone is competitive to the state-of-the-art AAIPR [33]. (2) A clear performance gain is obtained by combining both global and local embedding as a whole in person search. This validates the complementary benefits and performance advantages of jointly learning local and global visual-textual embedding interactively in the present system and method (AIHM).

Quality-aware fusion. Recall that a quality-aware fusion (Eq (6)) was included in AIHM for alleviating the negative effect of noisy and ambiguous observation in local visual-textual embedding. The efficacy of this component was tested in comparison to the common average pooling strategy. Table 4 shows that our quality-aware fusion is more effective in suppressing noisy information, e.g. improving over the average pooling in Rank1/mAP rates by 6.2%/0.5% on Market-1501, 5.6%/1.3% on DukeMTMC, and 5.2%/1.9% on PA100K, respectively. This shows the benefit of taking into account the input data quality in person search.

Negative category augmentation. To combat the one-shot learning challenge in global textual embedding, negative category augmentation was exploited in AIHM model learning, so to enrich training text data for reducing over-fitting risk. Three different augmentation sizes were tested: 5 k, 10 k, and 20 k. It is shown in FIG. 6 that this text augmentation is clearly beneficial to AIHM. For example, with 10 k negative categories, 4.4%, 5.5% and 3.8% gain were obtained at Rank-1 on Market-1501, DukeMTMC, and PA100K, respectively. The optimal augmentation size is around 10 k. Its benefit can be understood from a negative hard mining viewpoint, which improves model discriminative learning given limited training category data. However, too many (e.g. 20 k) negative pairs seem to have negatively overwhelmed model learning due to limited positive pairs.

Person search by individual attribute recognition. Two high-level model design strategies were examined for person search: (1) Attribute Recognition (AR): Using the attribute prediction scores by the AIHM's visual component, and the $L_2$ distance metric in the attribute vector space for cross-modal matching and ranking. (2) Learning to match strategy, i.e. the AIHM, which considers both global category-level and local attribute-level textual-visual embedding. It is interesting to find from table 5 that the AR baseline performs reasonably well when compared to other techniques in table 2. For example, AR even approaches the performance of the state-of-the-art person search model AAIPR [33]. Note that, this strong AR is likely to benefit from our hierarchical embedding learning design. The big performance margins of the present model over AR suggests that the learning to match strategy in joint optimisation is superior.

Global textual embedding. Three design considerations for learning the global textual embedding were examined: (1) Individual attribute representation: One-Hot (OH) vs Word2Vec (WV), (2) Aggregation of multiple attribute embedding: RNN (LSTM) vs CNN. (3) Binary-class label representation: Zero vs Transformed Input. Table 6 shows that:

(1) OH+CNN outperforms OH+RNN, suggesting that artificially introducing the modelling of temporal structure information on orderless person attributes is not only unnecessary but also brings adverse effect to model performance. (2) WV+CNN outperforms OH+CNN, indicating that WV is a more informative attribute representation particularly in case of sparse training attribute data. Textual embedding design via CNN is superior to directly using WV, suggesting the necessity of feature transformation because the generic WV is not optimised particularly for person image analysis.

Multi-task learning scalability. Multi-task learning for local visual-textual embedding was used, so the branch number is decided by the attribute set size $N_{att}$ (FIG. 7(a)). For scaling to cases of many attributes, a branch for a group of attributes was used. A controlled evaluation with two hierarchical layers was conducted. Given $N_{att}$ attributes, these were randomly grouped them into four size-balanced groups before applying the method (AIHM) (FIG. 7(b)). This was repeated for five trials of different grouping and the average results are reported. Table 7 shows that attribute grouping reduces model performance due to less fine-grained local embedding, as expected. Importantly, the performance drop is not significant. This also verifies the AIHM design motivation of incorporating local and global embedding jointly.

Figure 7:
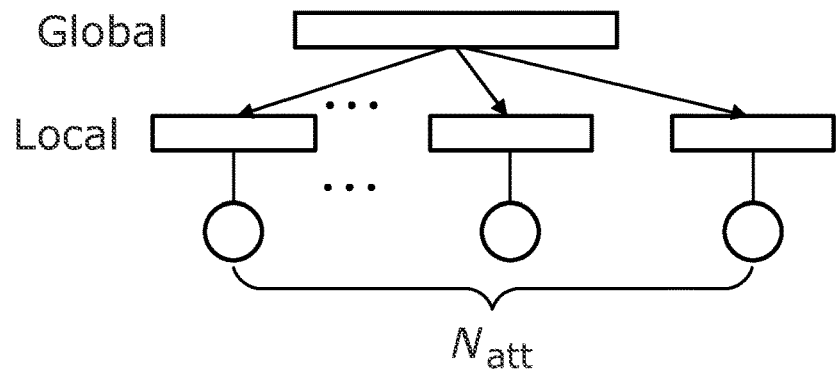
FIGS. 7a to 7c show schematic diagrams of hierarchies within machine learning models used with the system of FIG. 3.
Figure 7:
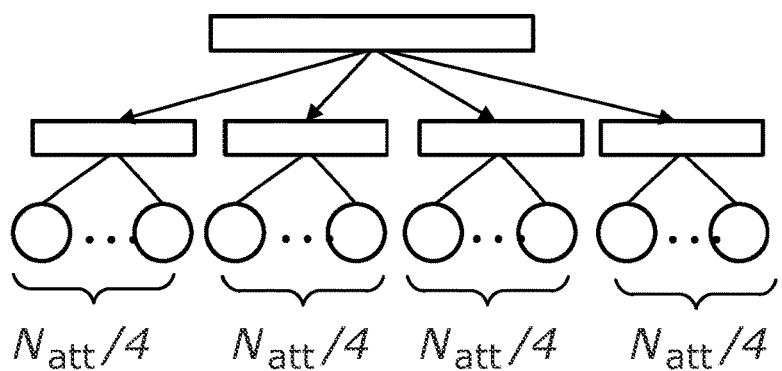
Figure 7:
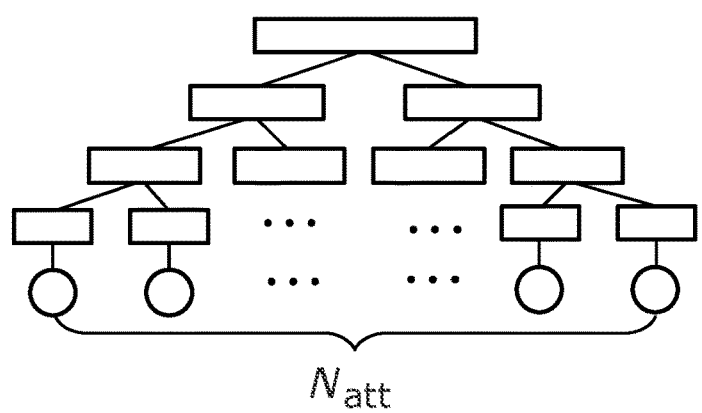

FIG. 7 shows several hierarchy variants. (a) Two levels, one branch one attribute, Natt branches totally; (b) Two levels, one branch Natt=4 attributes, 4 branches totally; and (c) Four levels, 2 branches at layer-2, end by Natt branches.

Hierarchy depth. The effect of AIHM's hierarchy depth was evaluated on model performance. Random grouping to form size-balanced intermediate layers was used for I-layers (I=2/4) hierarchies (see FIG. 7(c)). The results were averaged over five trials. Table 8 shows that a hierarchy with more layers leads to better model performance but come with higher computational costs (one feature vector per hierarchy node per modality, fusion over all layers).

Unlike most existing methods, which assume image based queries that are not always available in practice, the present system and method (AIHM) enables person search with only short text attribute descriptions. In contrast to few existing methods for attribute query person search, this problem is formulated as an extended zero-shot learning problem with a more principled approach to its solution. Algorithmically, the AIHM model solves the fundamental limitations of existing ZSL learning methods by joint global category-level and local attribute-level visual-textual embedding and matching. This aims to eliminate their respective modelling weaknesses whilst optimising their mutual complementary advantages. Extensive comparative evaluations demonstrated the performance superiority of the AIHM model over a wide range of existing alternative methods on three attribute person search benchmarks. Detailed component analysis were provided in order to give insights on model design and its performance advantages.

As described above, an example implementation of the system and method (AIHM) comprises four components: (1) Hierarchical visual embedding, (2) Hierarchical textual embedding, (3) Cross-modality cross-level embedding, and (4) Matching module. The network design of these components are detailed below. The embedding dimensions as summarised in table 9.

Hypercritical Visual Embedding Network. The Details of the 2-Layers and 4-Layers Hier-Archical Visual Embedding Follow.

Figure 8:
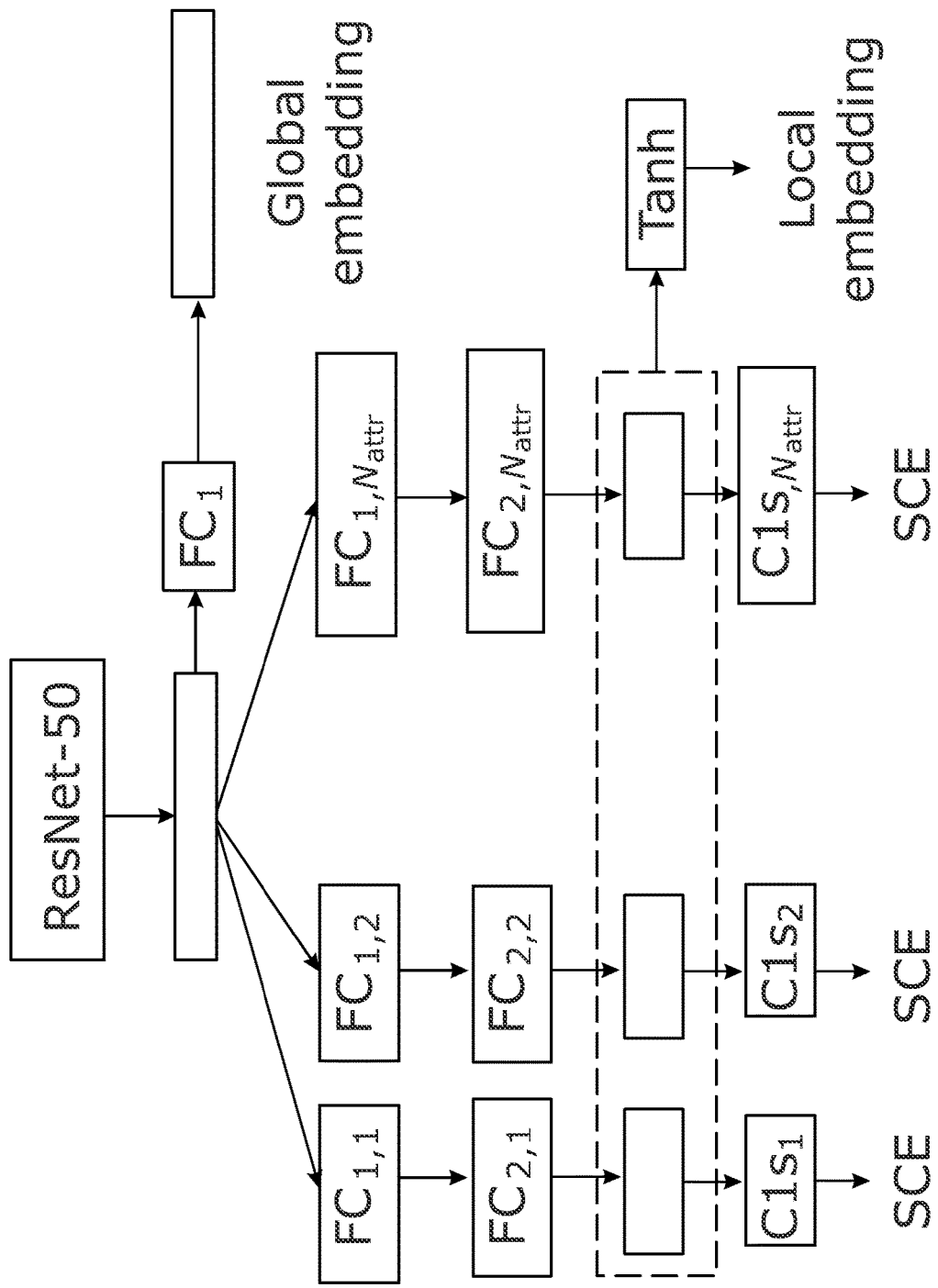
FIG. 8 shows a schematic diagram of further machine learning models of the system of FIG. 3.

2-Layers Hierarchical Visual Embedding. In the previously described experiments, a 2-layers multitask learning design for hierarchical visual embedding is described. The architecture details are shown in FIG. 8 with the layer configurations listed in table 10.

Figure 9:
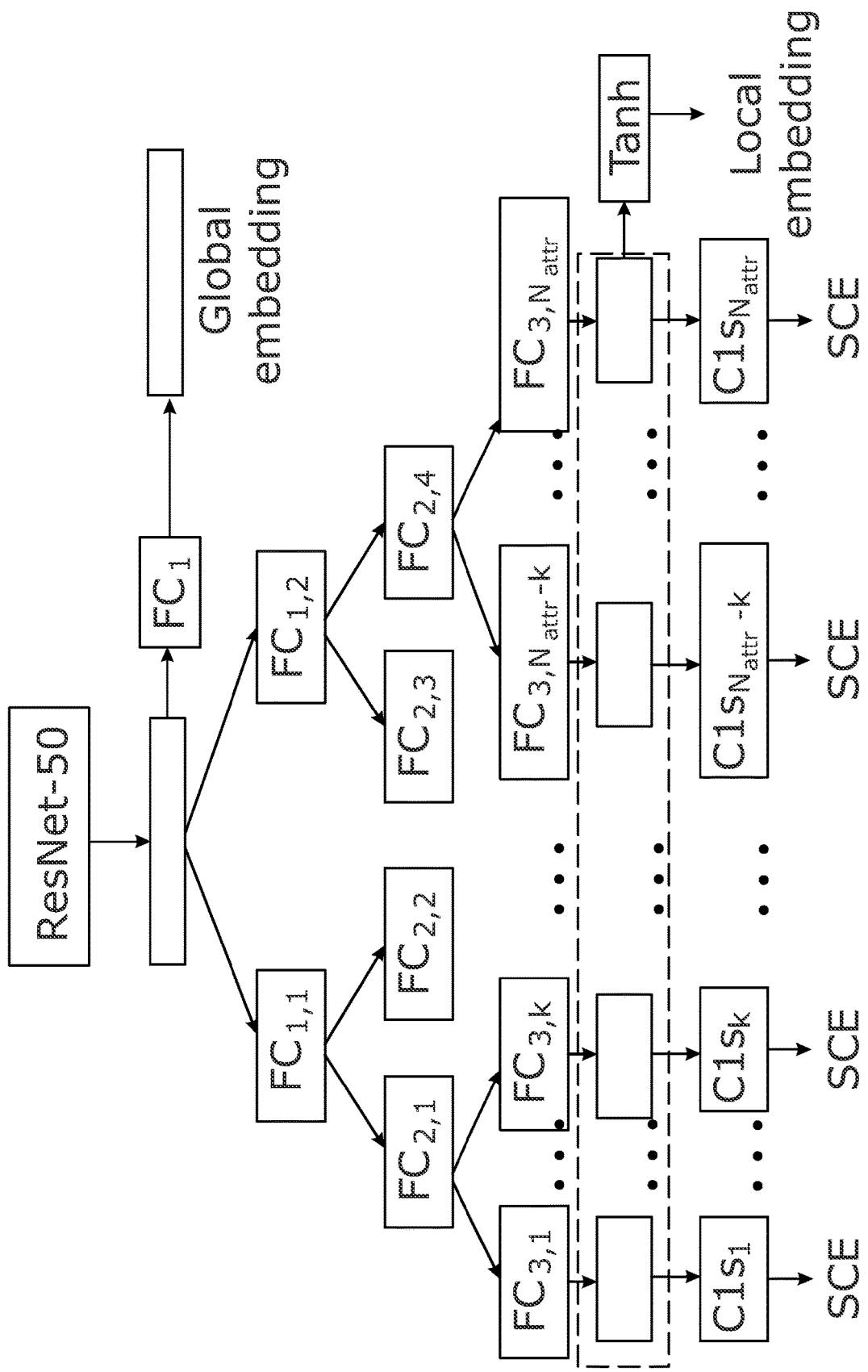
FIG. 9 shows a schematic diagram of a further machine learning model used with the system of FIG. 3.

4-Layers Hierarchical Visual Embedding. The 4-layers hierarchical visual embedding is by a tree-structured multi-task learning design. The architecture design is shown in FIG. 9 with the layer configuration listed in table 11.

Hypercritical Textual Embedding Network. The textual embedding consists of two parts: (1) local textual embedding and (2) global textual embedding. Similarly, 2-layers and 4-layers hierarchical textual embedding are described, respectively.

Figure 10:
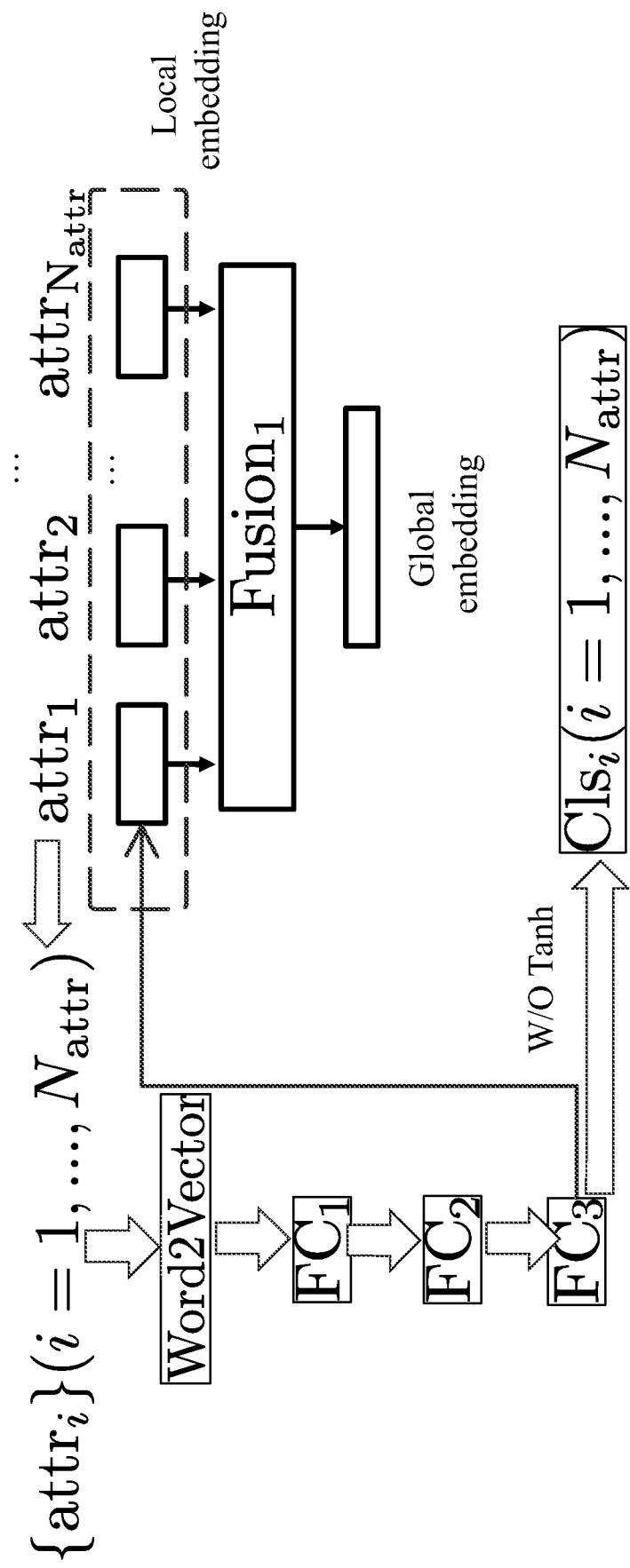
FIG. 10 shows a schematic diagram of a portion of the method of FIG. 3.

2-Layers Hierarchical Textual Embedding. In textual embedding, the input is a set of text attributes. Each text attribute is firstly passed into a word2vector model trained on Wikipedia [38] and then into three FC layers. The resulting local embeddings are then utilised to form the global embedding. See the architecture in FIG. 10 and layer configuration in table 12.

Figure 11:
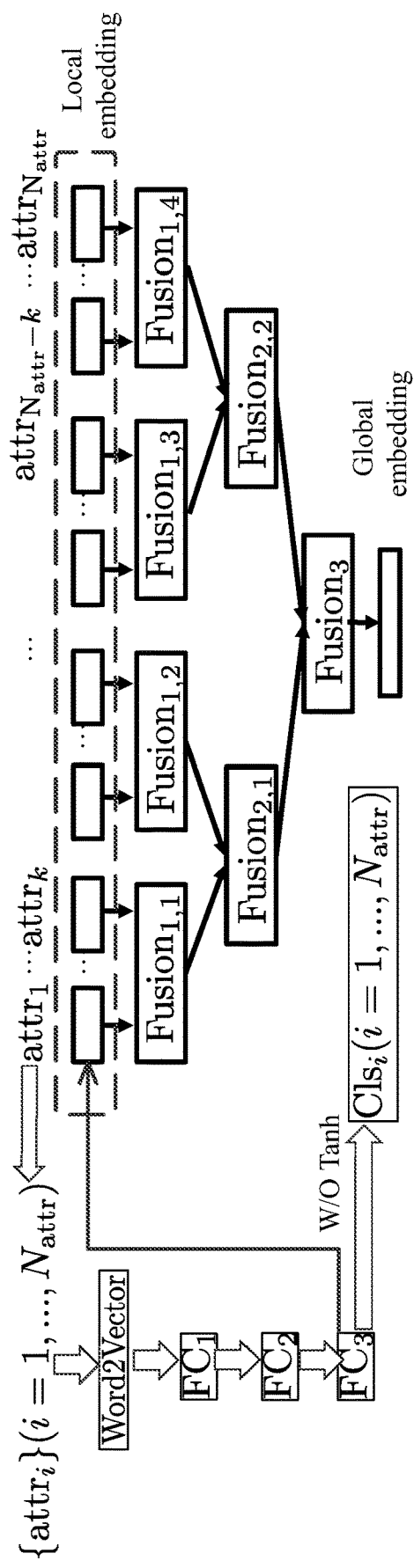
FIG. 11 shows a schematic diagram of a further portion of the method of FIG. 3.

4-Layers Hierarchical Textual Embedding. The 4-layers textual embedding is in a similar structure as the 2-layers counterpart. See the architecture in FIG. 11 and layer configuration in table 13.

Cross-Modality Cross-Level Embedding. Given the hierarchical visual and textual embedding, global-level cross-modality embedding is conducted followed with cross-level cross-modality embedding. The configuration of layers are listed in table 14.

Figure 12:
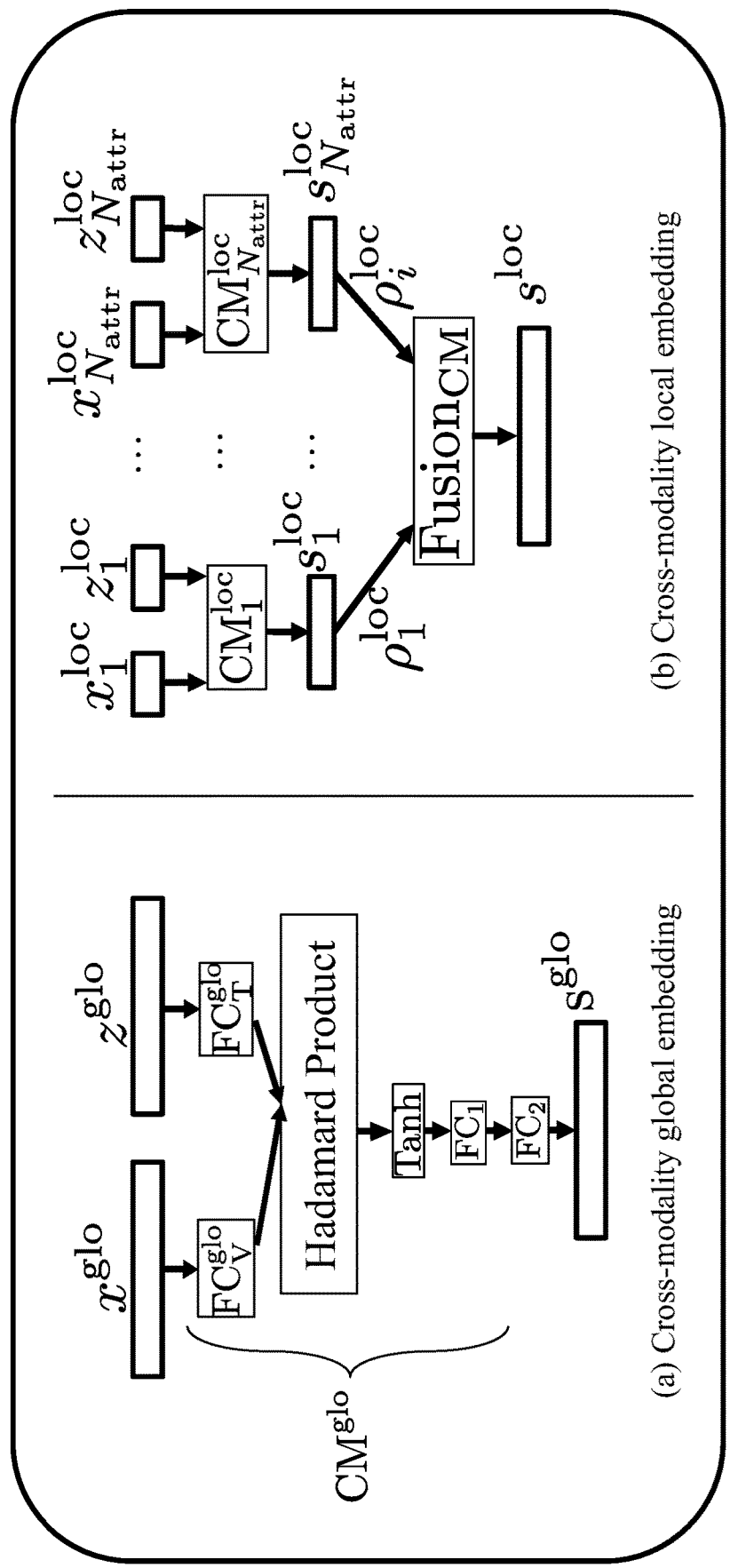
FIG. 12 shows a schematic diagram of a further portion of the method of FIG. 3.

Cross-Modality Global-Level Embedding. The global-level fusion module takes as input the global visual embedding $x^{glo}$ and the global textual embedding $z^{glo}$, outputting the global cross-modality embedding $g^{glo}$. The architecture is shown in FIG. 12.

Cross-Modality Local-level Embedding. The local-level fusion module takes as input the local visual embedding $\{x_i^{loc}\}_{i=1}^{N_{att}}$ and the local textual embedding $\{z_i^{loc}\}_{i=1}^{N_{att}}$, outputting the local cross-modality embedding $s^{loc}$. The architecture is given in FIG. 12 (b).

Figure 13:
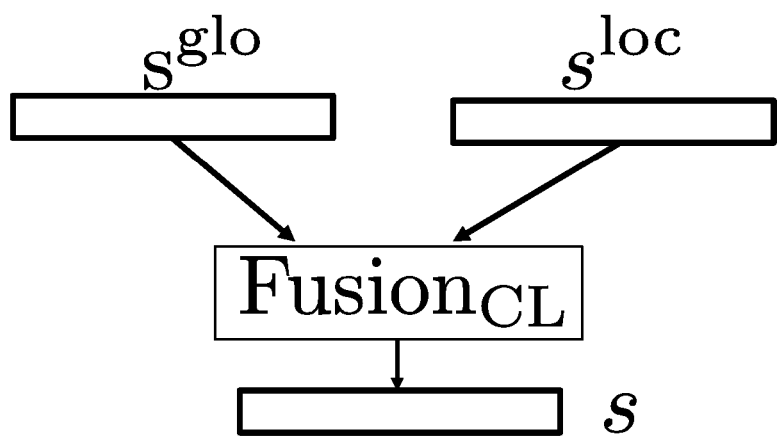
FIG. 13 shows a schematic diagram of a further portion of the method of FIG. 3.

Cross-Modality Cross-Level Embedding. Given the global $s^{glo}$ and local $s^{loc}$ cross-modality embedding, we obtain the cross-modality cross-level embedding s as shown in FIG. 13.

Figure 14:
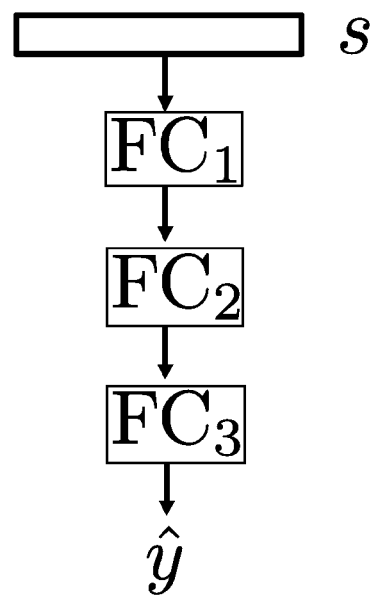
FIG. 14 shows a schematic diagram of a matching module used within the system of FIG. 3.

Matching Module. The matching module takes as input the cross-modality cross-level embedding s, and outputs the similarity score $\hat{y} \in [0,1]$ of the input image and attribute set. In training, we set the ground-truth similarity score 1 for the matching attribute-image pairs and 0 for the unmatched attribute-image pairs. The details are shown in table 15 and FIG. 14.

As will be appreciated by the skilled person, details of the above embodiment may be varied without departing from the scope of the present invention, as defined by the appended claims.

For example, although the examples provided use images of people and the text-based search are descriptions of physical attributes of people, the methods, techniques and systems can be used with images (e.g. from video sources) of other targets. For example, the system and method may be used with searching for manufactured products, buildings, animals, plants and geographic or natural structures, for example.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

TABLE 1

Statistics of person search datasets. Other datasets may be used

| Datasets | Market-1501 | DukeMTMC | PA100L |
|---|---|---|---|
| # Attribute category | 10 | 8 | 15 |
| # Train person category | 508 | 300 | 2020 |
| # Train image | 12,936 | 16,522 | 80,000 |
| # Test person category | 529 | 387 | 849 |
| # Unseen | 367 | 229 | 168 |
| # Test image | 15,913 | 19,889 | 10,000 |

TABLE 2

Comparisons to the state-of-the-art methods.

| | Market-1501 | | | | DukeMTMC | | | | PA100K | | | |
|---|---|---|---|---|---|---|---|---|---|---|---|---|
| Method | Rank1 | Rank5 | Rank 10 | mAP | Rank 1 | Rank 5 | Rank 10 | mAP | Rank 1 | Rank 5 | Rank 10 | mAP |
| DEM[34] | 34.0 | 48.1 | 57.5 | 17.0 | 22.7 | 43.9 | 54.5 | 12.9 | 20.8 | 38.7 | 44.2 | 14.8 |
| RN[25 | 17.2 | 38.7 | 47.3 | 15.5 | 25.1 | 42.0 | 51.5 | 13.0 | 27.5 | 38.8 | 46.6 | 13.6 |
| GAZSL[37] | 23.3 | 36.9 | 45.9 | 14.1 | 18.2 | 30.0 | 37.8 | 11.9 | 2.2 | 3.8 | 5.3 | 0.9 |
| Deep CCAE[30] | 8.1 | 23.9 | 34.5 | 9.7 | 33.2 | 59.3 | 67.6 | 14.9 | 21.2 | 39.7 | 48.0 | 15.6 |
| DeepCCA[1] | 29.9 | 507 | 58.1 | 17.5 | 36.7 | 58.8 | 65.1 | 13.5 | 19.5 | 40.3 | 49.0 | 15.4 |
| 2WayNet[3] | 11.2 | 24.3 | 31.4 | 7.7 | 25.2 | 39.8 | 45.9 | 10.1 | 19.5 | 26.6 | 34.5 | 10.6 |
| MMD[26] | 34.1 | 47.9 | 57.2 | 18.9 | 41.7 | 62.3 | 68.6 | 14.2 | 25.8 | 38.9 | 46.2 | 14.4 |
| DeepCoral[24] | 36.5 | 47.6 | 55.9 | 20.0 | 46.1 | 61.0 | 68.1 | 17.1 | 22.0 | 39.7 | 48.1 | 14.1 |
| VSE++[4] | 27.0 | 49.1 | 58.2 | 17.2 | 33.6 | 54.7 | 62.8 | 15.5 | 22.7 | 39.8 | 48.1 | 15.7 |
| AAIPR[33] | 40.2 | 49.2 | 58.6 | 20.6 | 46.6 | 59.6 | 69.0 | 15.6 | 27.3 | 40.5 | 49.8 | 15.2 |
| SCAN[13] | 4.0 | 10.1 | 15.3 | 2.1 | 3.5 | 9.3 | 14.3 | 1.6 | 2.9 | 8.2 | 12.5 | 1.9 |
| GNA-RNN[15] | 30.4 | 38.7 | 44.4 | 15.4 | 34.6 | 52.7 | 65.8 | 14.2 | 20.3 | 30.8 | 38.2 | 9.3 |
| CMCE[14] | 35.0 | 50.9 | 56.4 | 22.8 | 39.7 | 56.3 | 62.7 | 15.4 | 25.8 | 34.9 | 45.4 | 13.1 |
| AIHM | 45.2 | 56.7 | 64.5 | 24.3 | 50.5 | 65.2 | 75.3 | 17.4 | 31.3 | 45.1 | 51.0 | 17.0 |

Bold: Best results.

TABLE 3

Hierarchical embedding and matching analysis.

| | Market-1501 | | DukeMTMC | | PA100K | |
|---|---|---|---|---|---|---|
| Method | Rank1 | mAP | Rank1 | mAP | Rank1 | mAP |
| Global Only | 30.6 | 20.5 | 40.7 | 13.7 | 26.1 | 14.3 |
| Local Only | 39.5 | 21.9 | 46.9 | 15.3 | 29.4 | 15.6 |
| Hierarchy | 45.2 | 24.3 | 50.5 | 17.4 | 31.3 | 17.0 |

TABLE 4

Quality-aware fusion vs. Average Pooling

| | Market-1501 | | DukeMTMC | | PA100K | |
|---|---|---|---|---|---|---|
| Method | Rank1 | mAP | Rank1 | mAP | Rank1 | mAP |
| Avg Pool | 39.0 | 23.8 | 44.9 | 16.1 | 26.1 | 15.1 |
| AIHM | 45.2 | 24.3 | 50.5 | 17.4 | 31.3 | 17.0 |

TABLE 5

Model design strategy examination: Attribute Recognition (AR) vs Learning to Compare (as AIHM)

| Dataset | Method | Rank1 | Rank5 | Rank10 | mAP |
|---|---|---|---|---|---|
| Market-1501 | AR | 35.7 | 47.8 | 57.8 | 19.8 |
| | AIHM | 45.2 | 56.7 | 64.5 | 24.3 |
| DukeMTMC | AR | 42.0 | 52.9 | 63.2 | 15.8 |
| | AIHM | 50.5 | 65.2 | 75.3 | 17.4 |
| PA100K | AR | 30.3 | 42.8 | 47.8 | 13.8 |
| | AIHM | 31.3 | 45.1 | 51.0 | 17.0 |

TABLE 6

Global textual embedding analysis.

| | Market-1501 | | DukeMTMC | | PA100K | |
|---|---|---|---|---|---|---|
| Method | Rank1 | mAP | Rank1 | mAP | Rank1 | mAP |
| OH + RNN | 35.7 | 17.8 | 46.6 | 16.8 | 21.4 | 12.3 |
| OH + CNN | 37.1 | 21.0 | 49.8 | 18.1 | 25.3 | 13.7 |
| WV | 43.8 | 22.9 | 48.7 | 16.2 | 29.1 | 14.2 |
| OH + CNN | 39.1 | 22.0 | 46.5 | 16.1 | 25.3 | 13.7 |
| WV + CNN | 45.2 | 24.3 | 50.5 | 17.4 | 31.3 | 17.0 |

OH: One-Hot; WV: Word2Vec.

TABLE 7

Scalability of multi-task learning local embedding.

| | Market-1501 | | DukeMTMC | | PA100K | |
|---|---|---|---|---|---|---|
| #Branch | Rank1 | mAP | Rank1 | mAP | Rank1 | mAP |
| $N_{att}/4$ | 43.5 | 23.9 | 47.9 | 15.6 | 30.3 | 16.3 |
| $N_{att}$ | 45.2 | 24.3 | 50.5 | 17.4 | 31.3 | 17.0 |

TABLE 8

Effect of hierarchy depth.

| | Market-1501 | | DukeMTMC | | PA100K | |
|---|---|---|---|---|---|---|
| #Depth | Rank1 | mAP | Rank1 | mAP | Rank1 | mAP |
| 2 | 45.2 | 24.3 | 50.5 | 17.4 | 31.3 | 17.0 |
| 4 | 47.5 | 25.2 | 53.6 | 18.5 | 33.4 | 17.8 |

TABLE 9

Embedding dimensions

| Definition | Notation | Value |
|---|---|---|
| Local embedding dimension | $Dim_{emb}^{loc}$ | 512 |
| Global embedding dimension | $Dim_{emb}^{glo}$ | 1024 |
| Cross-modal embedding dimension | $Dim_{emb}^{loc}$ | 512 |

TABLE 10

Configuration of 2-layers visual embedding

| Structure | Size |
|---|---|
| ResNet-50 | Output size is 2048 |
| $FC_1$ | $2048 \times Dim_{emb}^{glo}$ |
| | Tanh |
| $FC_{1,i}$ (i = 1, 2, ..., $N_{Attr}$) | $2048 \times 1024$ |
| | ReLU |
| $FC_{2,i}$ (i = 1, 2, ..., $N_{Attr}$) | $1024 \times Dim_{emb}^{loc}$ |
| Classification$_i$ (i = 1, 2, ..., $N_{Attr}$) | $Dim_{emb}^{glo} \times N_{Attr_i}$ |

TABLE 11

Configuration of 4-layers visual embedding.

| Structure | Size |
|---|---|
| ResNet-50 | Output size is 2048 |
| $FC_1$ | $2048 \times Dim_{emb}^{glo}$ |
| | Tanh |
| $FC_{1,i}$ (i = 1, 2) | $2048 \times 1024$ |
| | ReLU |
| $FC_{2,i}$ (i = 1, 2, 3, 4) | $1024 \times 512$ |
| | ReLU |
| $FC_{3,i}$ (i = 1, 2, ..., $N_{Attr}$) | $512 \times Dim_{emb}^{loc}$ |
| Classification$_i$ (i = 1, 2, ..., $N_{Attr}$) | $Dim_{emb}^{glo} \times N_{Attr_i}$ |

TABLE 12

Configuration of 2-layers textual embedding.

| Structure | Size |
|---|---|
| ResNet-50 | Output size is 2048 |
| $FC_1$ | $300 \times 512$ |
| | Tanh |
| $FC_2$ | $512 \times 1024$ |
| | Tanh |
| $FC_3$ | $1024 \times Dim_{emb}^{loc}$ |
| | Tanh |
| $Cls_i$ (i = 1, 2, ..., $N_{Attr}$) | $Dim_{emb}^{loc} \times N_{Attr_i}$ |
| $Fusion_1$ | Conv $Dim_{emb}^{loc}$, $Dim_{emb}^{glo}$, 1, 1, 0 |
| | Conv [$N_{Attr}$, 1, 1, 1, 0] |
| | Tanh |

The setting of Conv layers: the number of input channels, the number of output channels, kernel size, stride, and padding.
Cls: Classification.

TABLE 13

Configuration of 4-layers textual embedding.

| Structure | Size |
|---|---|
| $FC_1$ | 300 × 512 |
| | Tanh |
| $FC_2$ | 512 × 1024 |
| | Tanh |
| $FC_3$ | 1024 × $Dim_{emb}^{loc}$ |
| | Tanh |
| $Cls_i$ (i = 1, 2, . . . , $N_{Attr}$) | $Dim_{emb}^{loc}$ × $N_{Attr_i}$ |
| $Fusion_{1,i}$ (i = 1, 2, 3, 4) | Conv $Dim_{emb}^{loc}$, $Dim_{emb}^{glo}$, 512, 1, 1, 0 |
| | Conv [k, 1, 1, 1, 0] |
| | Tanh |
| $Fusion_{2,i}$ (i = 1, 2) | Conv [512, 512, 1, 1, 0] |
| | Conv [2, 1, 1, 1, 0] |
| | Tanh |
| $Fusion_3$ | Conv [512, $Dim_{emb}^{loc}$, 1, 1, 0 |
| | Conv [2, 1, 1, 1, 0] |
| | Tanh |

Cls: Classification.

TABLE 14

Configuration of cross-level (CL) cross-modality (CM) embedding.

| Structure | Size |
|---|---|
| $FC_{T/V}^i$, i ∈ {glo, loc} | $Dim_{emb}^j$ × 512 |
| $FC_1$ | 512 × 512 |
| | Tanh |
| $FC_2$ | 512 × 512 |
| | Tanh |
| $Fusion_{CM}$ | Conv [512, $Dim_{emb}^S$, 1, 1, 0 |
| | Conv [$N_{Attr}$, 1, 1, 1, 0] |
| | Tanh |
| $Fusion_{CM}$ | Conv [512, $Dim_{emb}^S$, 1, 1, 0 |
| | Conv [$N_{Attr}$, 1, 1, 1, 0] |
| | Tanh |

TABLE 15

Configuration of matching module.

| Structure | Size |
|---|---|
| $FC_1$ | $Dim_{emb}^S$ × 256 |
| | ReLU |
| $FC_2$ | 256 × 128 |
| | ReLU |
| $FC_3$ | 128 × 1 |
| | Sigmoid |

REFERENCES

[1] G. Andrew, R. Arora, J. Bilmes, and K. Livescu. Deep canonical correlation analysis. In *ICML*, 2013. 5,6
[2] Q. Dong, S. Gong, and X. Zhu. Multi-task curriculum transfer deep learning of clothing attributes. In *WACV*, 2017. 4
[3] A. Eisenschtat and L. Wolf. Linking image and text with 2-way nets. In *CVPR*, 2017. 5, 6
[4] F. Faghri, D. J. Fleet, J. R. Kiros, and S. Fidler. Vse++: Improving visual-semantic embeddings with hard negatives. 2018. 5, 6
[5] Y. Fu, T. M. Hospedales, T. Xiang, and S. Gong. Transductive multi-view zero-shot learning. *IEEE transactions on pattern analysis and machine intelligence*, 37(11):2332-2345, 2015. 2
[6] S. Gong, M. Cristani, S. Yan, and C. C. Loy. *Person re-identification*. Springer, 2014. 1, 2
[7] K. He, X. Zhang, S. Ren, and J. Sun. Deep residual learning for image recognition. In *CVPR*, 2016. 4, 5
[8] M. Koestinger, M. Hirzer, P. Wohlhart, P. M. Roth, and H. Bischof. Large scale metric learning from equivalence constraints. In *CVPR*, 2012.
[9] C. H. Lampert, H. Nickisch, and S. Harmeling. Attribute-based classification for zero-shot visual object categorization. *IEEE Transactions on Pattern Analysis and Machine Intelligence*, 36(3):453-465, 2014. 3
[10] R. Layne, T. M. Hospedales, and S. Gong. *Attributes-based re-identification In Person Re-Identification*. Springer, 2014. 1, 2, 3
[11] R. Layne, T. M. Hospedales, and S. Gong. Re-id: Hunting attributes in the wild. In *BMVC*, 2014. 2, 3
[12] R. Layne, T. M. Hospedales, S. Gong, and Q. Mary. Person re-identification by attributes. In *BMVC*, 2012. 3
[13] K.-H. Lee, X. Chen, G. Hua, H. Hu, and X. He. Stacked cross attention for image-text matching. In *ECCV*, 2018. 5, 6
[14] S. Li, T. Xiao, H. Li, W. Yang, and X. Wang. Identity-aware-textual-visual matching with latent co-attention. In *ICCV*, 2017. 1, 2, 5, 6
[15] S. Li, T. Xiao, H. Li, B. Zhou, D. Yue, and X. Wang. Person search with natural language description. *CVPR*, 2017. 1, 2, 5, 6
[16] W. Li, R. Zhao, T. Xiao, and X. Wang. Deepreid: Deep filter pairing neural network for person re-identification. In *CVPR*, 2014. 1, 2
[17] W. Li, X. Zhu, and S. Gong. Harmonious attention network for person re-identification In *CVPR*, 2018. 2
[18] Y. Lin, L. Zheng, and W. Y. a. Y. Y. Zheng, and Zhedong. Improving person re-identification by attribute and identity learning *arXiv*, 2017. 2, 5
19] X. Liu, H. Zhao, M. Tian, L. Sheng, J. Shao, J. Yan, and X. Wang. Hydraplus-net: Attentive deep features for pedestrian analysis. In *ICCV*, 2017. 2. 5
[20] T. Mikolov, I. Sutskever, K. Chen, G. S. Corrado, and J. Dean. Distributed representations of words and phrases and their compositionality. In *NIPS*, 2013. 4
[21] P. Peng, Y. Tian, T. Xiang, Y. Wang, M. Pontil, and T. Huang. Joint semantic and latent attribute modelling for cross-class transfer learning. *TPAMI*, 2018. 3
[22] E. Ristani, F. Solera, R. Zou, R. Cucchiara, and C. Tomasi. Performance measures and a data set for multi-target, multi-camera tracking. In *ECCV workshop on Benchmarking Multi-Target Tracking*, 2016. 2, 5
[23] C. Su, S. Zhang, J. Xing, W. Gao, and Q. Tian. Deep attributes driven multi-camera person re-identification. In *ECCV*, 2016. 3
[24] B. Sun and K. Saenko. Deep coral: Correlation alignment for deep domain adaptation. In *ECCV*, 2016. 5, 6
[25] F. Sung, Y. Yang, L. Zhang, T. Xiang, P. H. Torr, and T. M. Hospedales. Learning to compare: Relation network for few-shot learning. In *CVPR*, 2018. 3, 4, 5, 6
[26] I. O. Tolstikhin, B. K. Sriperumbudur, and B. Schölkopf. Minimax estimation of maximum mean discrepancy with radial kernels. In *NIPS*. 5, 6
[27] D. A. Vaquero, R. S. Feris, D. Tran, L. Brown, A. Hampapur, and M. Turk. Attribute-based people search in surveillance environments. In Workshop of WACV, 2009. 1, 2, 3

[28] O. Vinyals, C. Blundell, T. Lillicrap, D. Wierstra, et al. Matching networks for one shot learning. In NIPS, 2016.

[29] J. Wang, X. Zhu, S. Gong, and W. Li. Transferable joint attribute-identity deep learning for unsupervised person re-identification. In *CVPR*, 2018. 3

[30] W. Wang, R. Arora, K. Livescu, and J. Bilmes. On deep multi-view representation learning. In *ICML*, 2015. 5, 6

[31] Y. Xian, C. H. Lampert, B. Schiele, and Z. Akata. Zero-shot learning—a comprehensive evaluation of the good, the bad and the ugly. *IEEE Transactions on Pattern Analysis and Machine Intelligence*, 2018. 2, 3

[32] W. Xie, L. Shen, and A. Zisserman. Comparator networks. *ECCV*, 2018. 5

[33] Z. Yin, W.-S. Zheng, A. Wu, H.-X. Yu, H. Wan, X. Guo, F. Huang, and J. Lai. Adversarial attribute-image person re-identification. In *IJCAI*, 2018. 1, 2, 3, 5, 6, 7

[34] L. Zhang, T. Xiang, and S. Gong. Learning a deep embed-ding model for zero-shot learning. In *CVPR*, 2017. 3, 5, 6

[35] L. Zheng, L. Shen, L. Tian, S. Wang, J. Wang, and Q. Tian. Scalable person re-identification: A benchmark. In *ICCV*, 2015. 1, 2, 5

[36] W.-S. Zheng, S. Gong, and T. Xiang. Reidentification by relative distance comparison. *TPAMI*, 2013. 1

[37] Y. Zhu, M. Elhoseiny, B. Liu, X. Peng, and A. Elgammal. A generative adversarial approach for zero-shot learning from noisy texts. In *CVPR*, 2018. 5, 6

[38] Z. Fu, T. Xiang, E. Kodirov and S. Gong. Zero-Shot Learning on Semantic Class Prototype Graph. IEEE Transactions on Pattern Analysis and Machine Intelligence, Vol. 40, No. 8, pp. 2009-2022, August 2018

[39] Y. Fu, T. Xiang, Y-G Jiang, X. Xue, L. Sigal, S. Gong. Recent Advances in Zero-Shot Recognition: Towards Data-Efficient Understanding of Visual Content. IEEE Signal Processing Magazine, Vol. 35, No. 1, pp. 112-125, January 2018

[40] X. Xu, T. Hospedales and S. Gong. Transductive Zero-Shot Action Recognition by Word-Vector Embedding. International Journal of Computer Vision, Vol. 123, No. 3, pp. 309-333, July 2017

[41] Y. Fu, T. Hospedales, T. Xiang and S. Gong. Transductive Multi-View Zero-Shot Learning. IEEE Transactions on Pattern Analysis and Machine Intelligence, Vol. 37, No. 11, pp. 2332-2345, November 2015

[42] T. Mikolov, I. Sutskever, K. Chen, G. Corrado, and J. Dean, "Distributed representations of words and phrases and their compositionality," in Proc. Neural Information Processing Systems Conf., 2013, pp. 3111-3119

The invention claimed is:

1. A method for building a machine learning model for finding visual targets from text queries, the method comprising the steps of:
receiving a set of training data comprising text attribute labelled images, wherein each image has more than one text attribute label;
receiving a first vector space comprising a mapping of words, the mapping defining relationships between words;
generating a visual feature vector space by grouping images of the set of training data having similar attribute labels;
mapping each attribute label within the training data set on to the first vector space to form a second vector space;
fusing the visual feature vector space and the second vector space to form a third vector space;
generating a similarity matching model from the third vector space; and
obtaining a global textual embedding, $z^{glo}$, according to:

$$z^{glo} = f(\{z_i^{loc}\}_{i=1}^{N_{att}}) = \text{Tanh}\left(\sum_{i=1}^{N_{att}} (w_2^i \cdot \text{Tanh}(w_1^i \cdot z_i^{loc}))\right)$$

where $w_1$ and $w_2$ are learnable parameters and Tan h is a non-linear activation function of a neuron in a Convolutional Neural Network, CNN, wherein mapping each attributed label within the training data set on to the first vector space to form a second vector space further comprises embedding each attribute label, $z_i^{loc}$, $i \in \{1, \ldots, N_{att}\}$.

2. The method of claim 1, wherein the similarity matching model is generated using a mean square error loss function.

3. The method of claim 2, wherein the mean square error loss function is:

$$\mathcal{L}_{mse} = 1/N_{batch} \Sigma_{(i=1)}^{(N\_batch)} [(y_i - y\perp\_i)^2]$$

where $y_i$ and $y\perp\_i$ denote the ground-truth and predicted similarity of the i-th training pair, respectively and a mini-batch size is specified by $N_{batch}$.

4. The method according to claim 1, wherein the first vector space is based on a Wikipedia pre-trained word2vector model.

5. The method according to claim 1, wherein the textual terms within the first vector space include the words of the text labels of the images within the training data set.

6. The method according to claim 1, wherein generating the visual feature vector space by grouping images of the set of training data having similar attribute labels further comprises discriminative learning using a softmax Cross Entropy loss in a Deep Convolutional Neural Network, CNN, where each attribute label is treated as a separate classification task, $\mathcal{L}_{cls}$, according to $$\mathcal{L}_{cls} = -\frac{1}{N_{batch}} \sum_{i=1}^{N_{batch}} \sum_{j=1}^{N_{attr}} \log(p_{ij}),$$

where $p_{ij}$ is a probability estimate of an i-th training sample on a j-th ground truth attribute.

7. The method of claim 1, further comprising discriminative learning using a softmax Cross Entropy loss, where each attribute label is treated as a separate classification task, $\mathcal{L}_{cls}$, according to $$\mathcal{L}_{cls} = -\frac{1}{N_{batch}} \sum_{i=1}^{N_{batch}} \sum_{j=1}^{N_{attr}} \log(p_{ij}),$$

where $p_{ij}$ is a probability estimate of an i-th training sample on a j-th ground truth attribute.

8. The method according to claim 1, wherein generating the visual feature vector space by grouping images of the set of training data having similar attribute labels further comprises building local attribute-specific embedding:

$$(x_i^{loc}, i \in \{1, \ldots, N_{att}\})$$

based on a global part ($x^{glo}$) in a ResNet-50 CNN architecture.

9. The method according to claim 1, wherein fusing the visual feature vector space and the second vector space to form the third vector space further comprises element-wise multiplication.

10. The method of claim 9, wherein the element-wise multiplication is a Hadamard Product in CNN learning optimization.

11. The method of claim 10, wherein for each attribute label a separate lightweight branch with two fully connected, FC, layers of a deep CNN are used.

12. The method of claim 10, further comprising cross-modality global-level embedding $s^{glo}$ according to:

$$s^{glo} = x^{glo} \circ z^{glo}$$

wherein ○ specifies the Hadamard Product.

13. The method according to claim 1, further comprising unlabelled images from a text query using the similarity matching model.

14. A method for building a machine learning model for finding visual targets from text queries, the method comprising the steps of:
  receiving a set of training data comprising text attribute labelled images, wherein each image has more than one text attribute label;
  receiving a first vector space comprising a mapping of words, the mapping defining relationships between words;
  generating a visual feature vector space by grouping images of the set of training data having similar attribute labels;
  mapping each attribute label within the training data set on to the first vector space to form a second vector space;
  fusing the visual feature vector space and the second vector space to form a third vector space; and
  generating a similarity matching model from the third vector space
  estimating a per-attribute quality, $P_i^{loc}$, using minimum prediction scores on image and text as:

$$p_i^{loc} = \min(p_i^{vis}, p_i^{tex}), i \in \{1, \ldots, N_{att}\}$$

where $p_i^{vis}$ and $P_i^{tex}$ denote ground-truth class posterior probability estimated by a corresponding classifier, wherein fusing the visual feature vector space and the second vector space to form the third vector space further comprises forming per-attribute cross-modality embedding according to:

$$s_i^{loc} = x_i^{loc} \circ z_i^{loc}, i \in \{1, \ldots, N_{att}\}$$

wherein fusing the visual feature vector space and the second vector space to form the third vector space is based on a quality aware fusion algorithm.

15. The method of claim 14, further comprising adaptively cross-attribute embedding according to:

$$s^{loc} = f(\{p_i^{loc} \cdot s_i^{loc}\}_{i=1}^{N_{att}}).$$

16. The method of claim 15, further comprising forming a final cross-modality cross-level embedding according to:

$$s = f(\{s^{loc}, s^{glo}\})$$

where the final embedding s is used to estimate an attribute matching result y.

17. One or more non-transitory computer readable media storing computer readable instructions which, when executed by a processor of a wireless communication device, cause the device to perform:
  receiving a set of training data comprising text attribute labelled images, wherein each image has more than one text attribute label;
  receiving a first vector space comprising a mapping of words, the mapping defining relationships between words;
  generating a visual feature vector space by grouping images of the set of training data having similar attribute labels;
  mapping each attribute label within the training data set on to the first vector space to form a second vector space;
  fusing the visual feature vector space and the second vector space to form a third vector space; and
  generating a similarity matching model from the third vector space; and
  obtaining a global textual embedding, $z^{glo}$, according to:

$$z^{glo} = f(\{z_i^{loc}\}_{i=1}^{N_{att}}) = \mathrm{Tanh}\left(\sum_{i=1}^{N_{att}} \left(w_2^i \cdot \mathrm{Tanh}(w_1^i \cdot z_i^{loc})\right)\right)$$

where $w_1$ and $w_2$ are learnable parameters and Tan h is a non-linear activation function of a neuron in a Convolutional Neural Network, CNN,
  wherein mapping each attributed label within the training data set on to the first vector space to form a second vector space further comprises embedding each attribute label, $z_i^{loc}$, $i \in \{1, \ldots, N_{att}\}$.

* * * * *